US008418952B2

(12) United States Patent
Balaskovic

(10) Patent No.: US 8,418,952 B2
(45) Date of Patent: *Apr. 16, 2013

(54) LENTICULAR AIRSHIP

(75) Inventor: Pierre Balaskovic, Verrières les Buisson (FR)

(73) Assignee: LTA Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,373

(22) Filed: Jan. 3, 2012

(65) Prior Publication Data

US 2012/0160959 A1 Jun. 28, 2012

Related U.S. Application Data

(60) Continuation of application No. 12/957,989, filed on Dec. 1, 2010, now Pat. No. 8,109,462, which is a division of application No. 11/907,883, filed on Oct. 18, 2007, now Pat. No. 7,866, 601.

(60) Provisional application No. 60/852,971, filed on Oct. 20, 2006, provisional application No. 60/877,667, filed on Dec. 29, 2006, provisional application No. 60/907,549, filed on Apr. 6, 2007.

(51) Int. Cl.
*B64B 1/12* (2006.01)
*B64B 1/10* (2006.01)

(52) U.S. Cl.
USPC .............................. 244/29; 244/96

(58) Field of Classification Search ............ 244/24, 244/30, 31, 87, 91, 96, 125, 126
See application file for complete search history.

(56) References Cited

U.S. PATENT DOCUMENTS

| 1,027,590 A | 5/1912 | Bucher |
| 1,944,467 A | 1/1934 | Sabin |

(Continued)

FOREIGN PATENT DOCUMENTS

| CA | 1054124 | 5/1979 |
| DE | 210003 | 5/1909 |

(Continued)

OTHER PUBLICATIONS

21st Century Airships Web Site, accessed Jun. 22, 2007, http://www.21stcenturyairships.com (1 page).

(Continued)

*Primary Examiner* — Timothy D Collins
*Assistant Examiner* — Brian M O'Hara
(74) *Attorney, Agent, or Firm* — Finnegan, Henderson, Farabow, Garrett & Dunner, LLP

(57) ABSTRACT

An airship may include a hull substantially shaped as an oblate spheroid, one or more frame members defining a support structure, wherein the support structure forms at least a partial support for the hull, at least one horizontal stabilizing member operably coupled to a lower surface of the airship, and at least one horizontal stabilizing member having a first end and a second end. The at least one horizontal stabilizing member may define an anhedral configuration. The airship may also include a vertical stabilizing member having a first end pivotally coupled to the airship and a second end oriented to remain below an upper surface of the airship. The vertical stabilizing member may be configured to pivot within a vertical plane, and the first end of the vertical stabilizing member and the first end of the at least one horizontal stabilizing member may be operably coupled to one another.

25 Claims, 16 Drawing Sheets

U.S. PATENT DOCUMENTS

| | | |
|---|---|---|
| 2,379,355 A | 6/1945 | Hodgdon |
| 2,935,275 A | 5/1960 | Grayson |
| 3,432,120 A | 3/1969 | Guerrero |
| D213,731 S | 4/1969 | Hsi |
| 3,477,168 A | 11/1969 | Trodglen |
| 3,580,636 A | 5/1971 | Setto |
| 3,820,744 A | 6/1974 | Denton |
| RE28,454 E | 6/1975 | Fitzpatrick et al. |
| 3,970,270 A | 7/1976 | Pittet, Jr. |
| 3,971,533 A | 7/1976 | Slater |
| 3,976,265 A | 8/1976 | Doolittle |
| 4,085,912 A | 4/1978 | Slater |
| 4,269,375 A | 5/1981 | Hickey |
| 4,326,681 A | 4/1982 | Eshoo |
| 4,461,436 A | 7/1984 | Messina |
| D274,999 S | 8/1984 | Reeves |
| D280,194 S | 8/1985 | Bothe |
| 4,685,640 A | 8/1987 | Warrington et al. |
| D305,418 S | 1/1990 | Blake |
| 4,901,948 A | 2/1990 | Panos |
| D307,131 S | 4/1990 | Kramer |
| 4,914,976 A | 4/1990 | Wyllie |
| D307,884 S | 5/1990 | Ninkovich |
| D309,887 S | 8/1990 | Ninkovich |
| 5,096,141 A | 3/1992 | Schley |
| 5,170,963 A | 12/1992 | Beck |
| 5,240,206 A | 8/1993 | Omiya |
| 5,348,251 A | 9/1994 | Ferguson |
| 5,351,911 A | 10/1994 | Neumayr |
| 5,368,256 A | 11/1994 | Kalisz et al. |
| 5,516,060 A | 5/1996 | McDonnell |
| 5,755,402 A | 5/1998 | Henry |
| 5,823,468 A | 10/1998 | Bothe |
| 5,906,335 A | 5/1999 | Thompson |
| D418,804 S | 1/2000 | Glasgow et al. |
| 6,010,093 A | 1/2000 | Paulson |
| 6,019,312 A | 2/2000 | Blenn |
| D424,508 S | 5/2000 | Hankinson et al. |
| 6,164,589 A | 12/2000 | Kalisz |
| 6,196,498 B1 | 3/2001 | Eichstedt et al. |
| 6,231,007 B1 | 5/2001 | Schäfer |
| 6,286,783 B1 | 9/2001 | Kuenkler |
| 6,293,493 B1 | 9/2001 | Eichstedt et al. |
| 6,302,357 B1 | 10/2001 | Kalisz |
| 6,311,925 B1 | 11/2001 | Rist |
| 6,315,242 B1 | 11/2001 | Eichstedt et al. |
| 6,328,257 B1 | 12/2001 | Schäfer |
| 6,565,037 B1 | 5/2003 | Tonkovich |
| 6,648,272 B1 | 11/2003 | Kothmann |
| 6,659,838 B1 | 12/2003 | Anderson |
| 6,880,783 B2 | 4/2005 | Munk |
| 6,925,949 B1 * | 8/2005 | Phillips .................... 114/102.1 |
| 6,966,523 B2 | 11/2005 | Colting |
| 7,040,572 B2 | 5/2006 | Munk |
| 7,055,777 B2 | 6/2006 | Colting |
| 7,108,228 B1 | 9/2006 | Marshall |
| 7,137,592 B2 | 11/2006 | Barocela et al. |
| 7,156,342 B2 | 1/2007 | Heaven et al. |
| 7,159,817 B2 | 1/2007 | VanderMey et al. |
| D583,294 S | 12/2008 | Balaskovic |
| 2002/0003189 A1 | 1/2002 | Kuenkler |
| 2002/0109045 A1 | 8/2002 | Beach et al. |
| 2003/0001044 A1 | 1/2003 | Munk |
| 2003/0127557 A1 | 7/2003 | Anderson et al. |
| 2003/0234320 A1 | 12/2003 | Colting |
| 2004/0162000 A1 | 8/2004 | Anderson |
| 2005/0277359 A1 | 12/2005 | Anderson |
| 2006/0016930 A1 | 1/2006 | Pak |
| 2006/0060695 A1 | 3/2006 | Walden et al. |
| 2006/0065777 A1 | 3/2006 | Walden et al. |
| 2006/0151666 A1 | 7/2006 | VanderMey et al. |
| 2006/0227013 A1 | 10/2006 | Harvison et al. |
| 2006/0261213 A1 | 11/2006 | Lavan |
| 2006/0284002 A1 | 12/2006 | Stephens et al. |
| 2007/0295859 A1 | 12/2007 | Colvin |

FOREIGN PATENT DOCUMENTS

| | | |
|---|---|---|
| DE | 2640433 C2 | 4/1977 |
| DE | 3508101 | 9/1986 |
| DE | 10011319 | 9/2001 |
| DE | 20116152 U1 | 2/2002 |
| DE | 10058072 | 6/2002 |
| DE | 20204023 U1 | 7/2002 |
| DE | 10120232 | 10/2002 |
| DE | 10121854 C1 | 11/2002 |
| DE | 10139877 | 2/2003 |
| DE | 10148589 | 4/2003 |
| DE | 10148590 | 4/2003 |
| DE | 10201133 | 7/2003 |
| DE | 10210541 | 9/2003 |
| DE | 10210542 | 9/2003 |
| DE | 10216480 | 10/2003 |
| DE | 10226868 | 12/2003 |
| DE | 10228048 | 1/2004 |
| DE | 10252895 | 5/2004 |
| DE | 10252896 | 5/2004 |
| DE | 10252908 | 5/2004 |
| DE | 10252909 | 5/2004 |
| DE | 10252910 | 5/2004 |
| DE | 10252911 | 5/2004 |
| DE | 10 2005 013529 | 6/2007 |
| EP | 0095763 A2 | 12/1983 |
| EP | 0 282 425 | 9/1988 |
| EP | 0 291 355 A2 | 11/1988 |
| EP | 0 503 801 A2 | 9/1992 |
| EP | 0 619 792 | 10/1994 |
| EP | 0 714 362 | 6/1996 |
| EP | 0 729 423 | 9/1996 |
| EP | 0 745 045 | 12/1996 |
| EP | 1 070 008 | 1/2001 |
| EP | 1 160 156 A2 | 12/2001 |
| EP | 1 292 474 | 3/2003 |
| EP | 1 294 608 | 3/2003 |
| EP | 1 451 063 | 9/2004 |
| EP | 1 529 726 A2 | 5/2005 |
| EP | 1 770 009 A2 | 4/2007 |
| FR | 2630397 | 10/1989 |
| FR | 2830838 | 4/2003 |
| GB | 2 197 276 A | 5/1988 |
| GB | 2 250 007 A | 5/1992 |
| GB | 2 275 036 A | 8/1994 |
| GB | 2 278 815 A | 12/1994 |
| GB | 2 300 010 A | 10/1996 |
| GB | 2359534 A | 8/2001 |
| GB | 2 366 274 A | 3/2002 |
| JP | 52145999 | 12/1977 |
| RU | 37568 50 | 10/1993 |
| RU | 2009073 C1 | 3/1994 |
| RU | 40822 S | 1/1995 |
| RU | 2028249 C1 | 2/1995 |
| RU | 2070136 C1 | 12/1996 |
| RU | 2092381 C1 | 10/1997 |
| RU | 2098318 C1 | 12/1997 |
| RU | 2111146 D1 | 5/1998 |
| RU | 2111147 C1 | 5/1998 |
| RU | 2114027 C1 | 6/1998 |
| RU | 2141911 C1 | 11/1999 |
| RU | 2196703 C2 | 1/2003 |
| RU | 2249536 C1 | 4/2005 |
| RU | 2250122 C1 | 4/2005 |
| SU | 1799335 A3 | 2/1993 |
| UA | 10870 A | 12/1996 |
| UA | 32397 A | 12/2000 |
| UA | 55928 A | 4/2003 |
| WO | WO 92/06002 | 4/1992 |
| WO | WO 93/13979 | 7/1993 |
| WO | WO 93/24364 A2 | 12/1993 |
| WO | WO 95/05307 | 2/1995 |
| WO | WO 95/14607 | 6/1995 |
| WO | WO 95/22486 | 8/1995 |
| WO | WO 95/27652 | 10/1995 |
| WO | WO 95/32893 | 12/1995 |
| WO | WO 95/32894 | 12/1995 |
| WO | WO 96/38340 | 12/1996 |
| WO | WO 97/15492 A2 | 5/1997 |

| | | |
|---|---|---|
| WO | WO-97/49606 | 12/1997 |
| WO | WO 98/28188 | 7/1998 |
| WO | WO 98/29303 A2 | 7/1998 |
| WO | WO 98/31589 | 7/1998 |
| WO | WO 99/67131 | 12/1999 |
| WO | WO 00/48902 | 8/2000 |
| WO | WO 00/73142 A2 | 12/2000 |
| WO | WO 01/42082 | 6/2001 |
| WO | WO 01/68447 A2 | 9/2001 |
| WO | WO 01/94172 | 12/2001 |
| WO | WO 03/021291 | 3/2003 |
| WO | WO 03/047967 | 6/2003 |
| WO | WO 03/055745 | 7/2003 |
| WO | WO 03/055746 | 7/2003 |
| WO | WO 03/074356 A3 | 9/2003 |
| WO | WO 03/097450 | 11/2003 |
| WO | WO 03/097451 | 11/2003 |
| WO | WO 2004/000642 | 12/2003 |
| WO | WO 2004/074091 A2 | 9/2004 |
| WO | WO 2004/087499 A2 | 10/2004 |
| WO | WO 2005/002960 | 1/2005 |
| WO | WO 2005/007508 | 1/2005 |
| WO | WO 2006/061617 | 6/2006 |
| WO | WO 2006/085919 A2 | 8/2006 |
| WO | WO 2006/137880 A2 | 12/2006 |
| WO | WO 2007/036038 | 4/2007 |
| WO | WO 2007/037932 A2 | 4/2007 |
| WO | WO 2007/045091 | 4/2007 |
| WO | WO 2007/065649 A2 | 6/2007 |

OTHER PUBLICATIONS

ALA-40 proof-of-concept—Thermoplane, Photos from "Janes—All the World's Aircraft," 1997 (2 pages).
Ben Ionnatta, "Spy Blimps and Heavy Lifters: The Latest Thing in Airships," Air & Space Smithsonian, Sep. 2007 (2 pages).
Blimp Europa N2A Web Site, accessed Oct. 11, 2006, machine translated Jun. 25, 2007, http://www.blimp-n2a.com/cl5alpha.htm (3 pages).
CargoLifter Web Site, accessed Jun. 19, 2007, http://cargolifter.info (2 pages).
Daniel P. Raymer, "Aircraft Design: A Conceptual Approach," 4th Ed., 2006, pp. 652-659, American Institute of Aeronautics and Astronautics, Inc., Reston, Virginia (11 pages).
Demonstrator Alpha, Lenticular Aircraft of Air Photography, accessed Oct. 11, 2006, machine translated Jun. 25, 2007, http://perso.orange.fr/balaskovic/actu-texte.html (2 pages).
Dynalifter Web Site, accessed Jun. 22, 2007, http://www.dynalifter.com (7 pages).
"Lift Equations," derived from "The Non-Rigid Airship Test and Evaluation Manual," U.S. Navy, 1940 (2 pages).
Michael A. Dornheim, "Skunks Working," Aviation Week, Feb. 6, 2006, accessed Jun. 22, 2007, http://www.aviationweek.com/aw/generic/story_generic.jsp?channel=awst&id=news/020606p2.xml (2 pages).
Gabriel A. Khoury and J. David Gillett, "Lenticular Mathematics," an excerpt from "Airship Technology," Cambridge University Press, 1999 (6 pages).
Lord Ventry and Eugene Kolesnik, Excerpt from "Jane's Pocket Book of Airships," Collier Books, 1977, pp. 94-96.
Edwin Mowforth, "Lenticular History," an excerpt from "An Introduction to the Airship," Second Edition, 2001, and information sheet (7 pages).
Operation-LTA Web Site, accessed Oct. 11, 2006, http://web.archive.org/web/20040405173243/www.operation-lta.com (5 pages).
Stephane Doncieux and Jean-Arcady Meyer, "Evolving Neural Networks for the Control of a Lenticular Blimp," AnimatLab—LIP6, 2003, France, http://animatlab.lip6.fr (12 pages).
Thomas F. Norton, "Now There's a 'Personal Blimp:' Unique Foldable Frame Makes it Practical as a Second Century Aircraft," General Aviation News, Jan. 19, 2007, p. 18-19, 59th year, No. 2, Flyer Media, Inc., Lakewood, WA (2 pages).
Worldwide Aeros Corporation Web Site, accessed Jun. 22, 2007, http://www.aerosml.com (4 pages).
Yu. Boiko and V.A. Turian, "Dreamboat of Centuries," Moscow, Machine Building, p. 52, Jun. 13, 1991 (2 pages).
U.S. Army Advanced Materiel Concepts Agency, "Aerial Very Heavy Lift Concepts for the 1990 Army vol. I", Basic Report, Nov. 1969 (41 pages).
U.S. Army Advanced Materiel Concepts Agency, "Aerial Very Heavy Lift Concepts for the 1990 Army vol. III," Academic and Industrial Presentations, Nov. 1, 1969 (200 pages).
Boeing Vertol Company for NASA Ames., "Feasibility Study of Modern Airships", Final Report, vol. 1, May 1975 (478 pages).
P.A. Mackrodt, "Further Studies in the Concept of Delta-Winged Hybrid Airships", J. Aircraft, Oct. 1, 1980, pp. 734-740.
Mark D. Ardema, "Missions and Vehicle Concepts for Modern, Propelled, Lighter-Than-Air Vehicles", AGARD, NATO, Feb. 1985 (50 pages).
Dr. R.S. Ross et al., "New Air Transport System for Heavy Bulky Cargo" (Advanced Copy), Apr. 20, 1962 (35 pages).
W.L. Marcy, "Parametric Design Study of Fully-Buoyant Naval Air Vehicles", NADC, Nov. 30, 1976 (85 pages).
Stepler, Richard M., "Return to Lighter Than Air Transportation for Military and Civilian Application", Defense Systems Management School, Fort Belvoir, VA, Nov. 1973 (56 pages).
L. Balis Crema et al., "Some Trends in Airship Technology Developments", NATO, Apr. 10-15, 1983 (14 pages).
"Types of Lighter-Than-Air Aircraft," Author unknown, Publication date unknown (34 pages).
Mark D. Ardema, "Vehicle Concepts and Technology Requirements for Buoyant Heavy-Lift Systems", NASA, 1979 (36 pages).
Mark D. Ardema, "Vehicle Concepts and Technology Requirements for Buoyant Heavy-Lift Systems", NASA Technical Paper, 1981 (18 pages).
David Bailey and William Mueller, "North Warning Airship Program, Final Overview," Naval Air Development Center, Apr. 6, 1987 (211 pages).
"Preliminary Design Investigation for New Payload and Ground Handling Concepts for Airships Operating in Remote Arctic Regions, Final Report," Naval Air Development Center, Mar. 31, 1986 (224 pages).
Capt. J. Arvi et al., "North Warning Program Airship Feasibility Tests, Final Report," Naval Air Development Center, Feb. 20, 1987 (42 pages).
Capt. J. Arvi et al., "North Warning System Familiarization, Feasibility and Operational Demonstration, Final Report," Naval Air Development Center, Apr. 19, 1986 (133 pages).
Douglas Botting, "The Giant Airships," Time-Life Books, Alexandria, VA 1980 (186 pages).
E. Udartsev and E. Tyan, "Dirigible of a New Generation in Kiev," available at http://www.aviajournal.com/sections/journal/arh/magazine/200112/index.html, Dec. 2001. (9 pages).
Edwin Mowforth, "An Introduction to the Airship," Third Edition, The Airship Association, Sep. 2007 (157 pages).
Construction Cost Management Co., "With Us, Future Comes Faster," available at http://www.buildcostcontrol.com/Airship/tabid/640/Default.aspx, 2008 (1 page).
Future Flight?, Leslie Deane, Ballooning, The Journal of the Balloon Federation of America, Jul./Aug. 2008, pp. 26-32.
Repoulias et al., "Dynamically Feasible Trajectory and Open-Loop Control Design for Unmanned Airships," 2007 Mediterranean Conference on Control and Automation, Jul. 27, 2007, XP002511581, Athens, Greece.
Nagabhushan et al., "Directional control of an advanced airship," AIAA Lighter-Than-Air Systems Technology Conference, 11th, Clearwater Beach, FL, May 15-18, 1995, Technical Papers (A95-30317 07-01), Washington, DC, American Institute of Aeronautics and Astronautics, May 15, 1995, pp. 107-116.
PCT report of partial international search regarding PCT/US2007/021962 Dec. 2, 2008.
PCT International Search Report re PCT/US2007/021962, mailed Apr. 3, 2009.
PCT International Search Report re PCT/US2008/009453, mailed Apr. 3, 2009.
http://dynalifter.com/, accessed Dec. 1, 2009 (16 pages).
http://hybridairvehicles.net/index.html, accessed Dec. 1, 2009 (23 pages).
http://www.skylifter.com.au/, accessed Dec. 1, 2009 (17 pages).
Luffman, "Aeroraft the Alternative Aircraft for Heavy Lift Transport or Crane Use," American Institute of Aeronautics and Astronautics, AIAA's 3rd Annual Aviation Technology, Integration, and Operations (ATIO) Tech, Nov. 17-19, 2003, Denver, Colorado, AIAA 2003-6754, pp. 1-13.
Ahmed Ghanmi and Abderrahmane Sokri, "Airships for military logistics heavy lift: A performance assessment for Northern operation applications," Defence R&D Canada—CORA, Technical Memorandum, Jan. 2010 (63 pages).

* cited by examiner

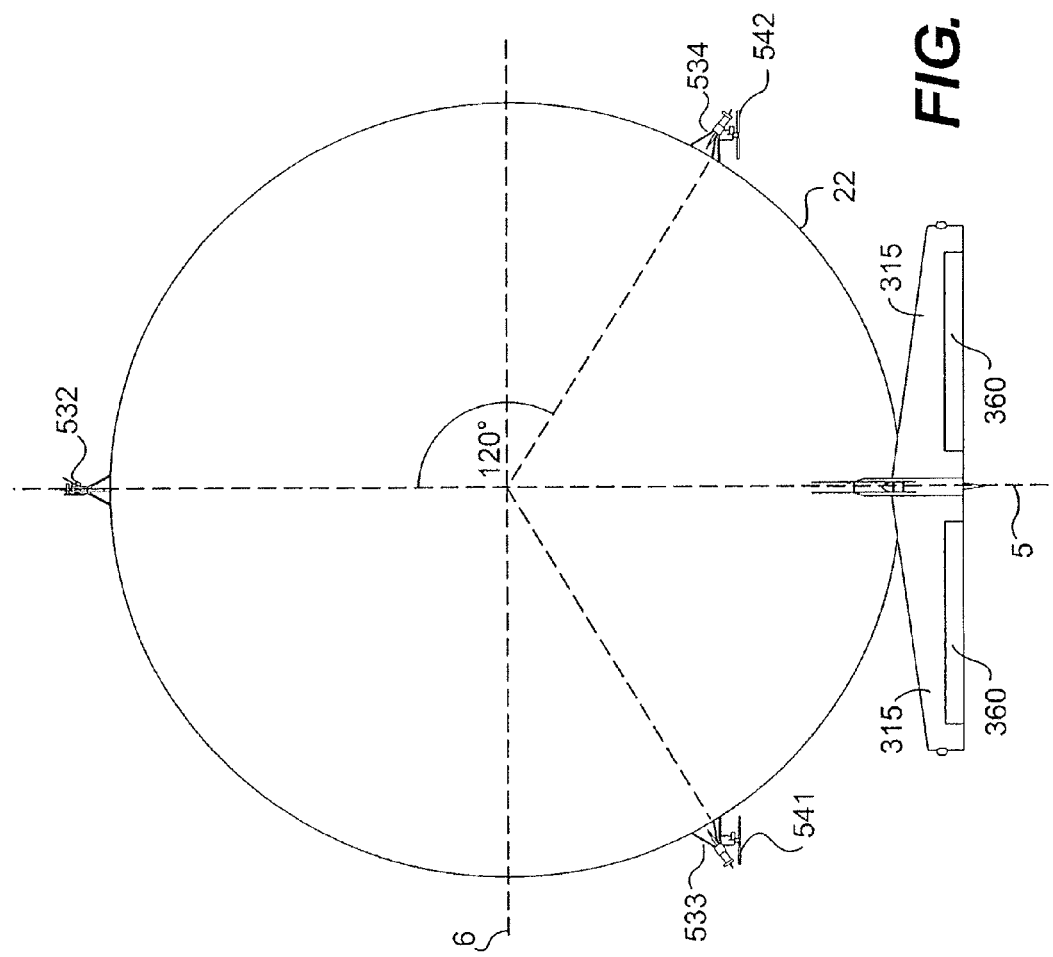

LENTICULAR AIRSHIP

RELATED APPLICATIONS

This application is a continuation of application Ser. No. 12/957,989, filed Dec. 1, 2010 now U.S. Pat. No. 8,109,462 now allowed, which is a divisional of application Ser. No. 11/907,883 filed Oct. 18, 2007, now U.S. Pat. No. 7,866,601. This application also claims priority under 35 U.S.C. §119 to U.S. Provisional Application No. 60/852,971, filed Oct. 20, 2006; U.S. Provisional Application No. 60/877,667, filed Dec. 29, 2006; and U.S. Provisional Application No. 60/907,549, filed Apr. 6, 2007. The subject matter of all of these previously-filed applications is hereby incorporated by reference.

TECHNICAL FIELD

The present disclosure relates to lenticular airship. More particularly, the disclosure relates to a lenticular airship.

BACKGROUND INFORMATION

Aerostatic lighter-than-air airships have seen substantial use since 1783 following the first successful manned flight of the Montgolfier brothers' hot air balloon. Numerous improvements have been made since that time, but the design and concept of manned hot air balloons remains substantially similar. Such designs may include a gondola for carrying a pilot and passengers, a heating device (e.g., a propane torch), and a large envelope or bag affixed to the gondola and configured to be filled with air. The pilot may then utilize the heating device to heat the air until the buoyant forces of the heated air exert sufficient force on the envelope to lift the balloon and an attached gondola. Navigation of such an airship has proven to be difficult, mainly due to wind currents and lack of propulsion units for directing the balloon.

To improve on the concept of lighter-than-air flight, some lighter-than-air airships have evolved to include propulsion units, navigational instruments, and flight controls. Such additions may enable a pilot of such an airship to direct the thrust of the propulsion units in such a direction as to cause the airship to proceed as desired. Airships utilizing propulsion units and navigational instruments typically do not use hot air as a lifting gas (although hot air may be used), with many pilots instead preferring lighter-than-air lifting gases such as hydrogen and helium. These airships may also include an envelope for retaining the lighter-than-air gas, a crew area, and a cargo area, among other things. The airships are typically streamlined in a blimp- or zeppelin-like shape, which, while providing reduced drag, may subject the airship to adverse aeronautic effects (e.g., weather cocking).

Airships other than traditional hot air balloons may be divided into several classes of construction: rigid, semi-rigid, non-rigid, and hybrid type. Rigid airships typically possess rigid frames containing multiple, non-pressurized gas cells or balloons to provide lift. Such airships generally do not depend on internal pressure of the gas cells to maintain their shape. Semi-rigid airships generally utilize some pressure within a gas envelope to maintain their shape, but may also have frames along a lower portion of the envelope for purposes of distributing suspension loads into the envelope and for allowing lower envelope pressures, among other things. Non-rigid airships typically utilize a pressure level in excess of the surrounding air pressure in order to retain their shape and any load associated with cargo carrying devices is supported by the gas envelope and associated fabric. The commonly used blimp is an example of a non-rigid airship.

Hybrid airships may incorporate elements from other airship types, such as a frame for supporting loads and an envelope utilizing pressure associated with a lifting gas to maintain its shape. Hybrid airships also may combine characteristics of heavier-than-air airship (e.g., airplanes and helicopters) and lighter-than-air technology to generate additional lift and stability. It should be noted that many airship, when fully loaded with cargo and fuel, may be heavier than air and thus may use their propulsion system and shape to generate aerodynamic lift necessary to stay aloft. However, in the case of a hybrid airship, the weight of the airship and cargo may be substantially compensated for by lift generated by forces associated with a lifting gas such as, for example, helium. These forces may be exerted on the envelope, while supplementary lift may result from aerodynamic lift forces associated with the hull.

A lift force (i.e., buoyancy) associated with a lighter-than-air gas may depend on numerous factors, including ambient pressure and temperature, among other things. For example, at sea level, approximately one cubic meter of helium may balance approximately a mass of one kilogram. Therefore, an airship may include a correspondingly large envelope with which to maintain sufficient lifting gas to lift the mass of the airship. Airships configured for lifting heavy cargo may utilize an envelope sized as desired for the load to be lifted.

Hull design and streamlining of airships may provide additional lift once the airship is underway, however, previously designed streamlined airships, in particular, may experience adverse effects based on aerodynamic forces because of such hull designs. For example, one such force may be weather cocking, which may be caused by ambient winds acting on various surfaces of the airship. The term "weather cocking" is derived from the action of a weather vane, which pivots about a vertical axis and always aligns itself with wind direction. Weather cocking may be an undesirable effect that may cause airships to experience significant heading changes based on a velocity associated with the wind. Such an effect may thereby result in lower ground speeds and additional energy consumption for travel. Lighter-than-air airships may be particularly susceptible to weather cocking and, therefore, it may be desirable to design a lighter-than-air airship to minimize the effect of such forces.

Landing and securing a lighter-than-air airship may also present unique problems based on susceptibility to adverse aerodynamic forces. Although many lighter-than-air airships may perform "vertical take off and landing" (VTOL) maneuvers, once such an airship reaches a point near the ground, a final landing phase may entail ready access to a ground crew (e.g., several people) and/or a docking apparatus for tying or otherwise securing the airship to the ground. Without access to such elements, the airship may be carried away by wind currents or other uncontrollable forces while a pilot of the airship attempts to exit and handle the final landing phase. Therefore, systems and methods enabling landing and securing of an airship by one or more pilots may be desirable.

The present disclosure is directed to addressing one or more of the desires discussed above utilizing various exemplary embodiments of an airship.

SUMMARY OF THE DISCLOSURE

In one aspect, the present disclosure is directed to an airship. The airship may include a hull substantially shaped as an oblate spheroid, one or more frame members defining a support structure, wherein the support structure forms at least a partial support for the hull, and at least one horizontal stabilizing member operably coupled to a lower surface of the airship. The airship may further include at least one horizontal stabilizing member having a first end and a second end, wherein the at least one horizontal stabilizing member defines an anhedral configuration and a vertical stabilizing member having a first end pivotally coupled to the airship and a second end oriented to remain below an upper surface of the airship, wherein the vertical stabilizing member is configured to pivot within a vertical plane, and wherein the first end of the vertical stabilizing member and the first end of the at least one horizontal stabilizing member are operably coupled.

In another aspect, the present disclosure is directed to an airship. The airship may include one or more frame members defining a support structure, wherein the support structure forms a support for a hull, a hull comprising at least one envelope configured to retain a volume of a lighter-than-air gas, wherein the envelope is operatively connected to the support structure, and upon filling with the lighter-than-air gas defines a substantially oblate spheroid shape, and at least five propulsion assemblies. A first of the at least five propulsion assemblies may be operably coupled to a support structure associated with the airship and located at a fore position on a periphery associated with the airship, a second of the at least five propulsion assemblies may be operably coupled to the support structure and located on the periphery at approximately 120 degrees with respect to the first propulsion assembly, and a third of the at least five propulsion assemblies may be operably coupled to the support structure and located on the periphery at approximately negative 120 degrees with respect to the first propulsion assembly. Further, a fourth propulsion assembly may be configured to direct a thrust along an axis substantially parallel to a roll axis of the airship and substantially co-located with the second of the at least five propulsion assemblies and a fifth propulsion assembly may be configured to direct a thrust along an axis substantially parallel to the roll axis of the airship and substantially co-located with the third of the at least five propulsion assemblies.

In yet another aspect, the present disclosure is directed to an arrangement for propulsion assemblies associated with a lighter-than-air airship. The arrangement may include at least five propulsion assemblies. In such an arrangement, a first of the at least five propulsion assemblies may be operably coupled to a support structure associated with the airship and located at approximately 0 degrees location on a periphery associated with the airship, a second of the at least five propulsion assemblies may be operably coupled to the support structure and located on the periphery at approximately 120 degrees with respect to the first propulsion assembly, and a third of the at least five propulsion assemblies may be operably coupled to the support structure and located on the periphery at approximately negative 120 degrees with respect to the first propulsion assembly. Further, fourth and fifth propulsion assemblies may be configured to direct a thrust along an axis substantially parallel to a roll axis of the airship.

According to a further aspect, the present disclosure is directed to an arrangement for propulsion assemblies associated with an airship. The arrangement may include five propulsion assemblies. A first of the five propulsion assemblies may be operably coupled to a support structure associated with the airship and located at a first location on a periphery associated with the airship, a second of the five propulsion assemblies may be operably coupled to the support structure and located on the periphery at approximately 120 degrees with respect to the first directable propulsion assembly, and a third of the five propulsion assemblies may be operably coupled to the support structure and located on the periphery at approximately negative 120 degrees with respect to the first directable propulsion assembly. Further, a fourth propulsion assembly may be configured to direct a thrust along an axis substantially parallel to a roll axis of the airship and substantially co-located with the second of the at least five propulsion assemblies, and a fifth propulsion assembly may be configured to direct a thrust along an axis substantially parallel to the roll axis of the airship and substantially co-located with the third of the at least five propulsion assemblies.

According to a further aspect, the present disclosure is directed to an empennage assembly for a lighter-than-air airship. The empennage assembly may include at least one horizontal stabilizing member having a first end and a second end, wherein the at least one horizontal stabilizing member defines an anhedral configuration, and a vertical stabilizing member having a first end pivotally coupled to the airship and a second end oriented to remain below an upper surface of the airship. The vertical stabilizing member may be configured to pivot within a vertical plane, and the first end of the vertical stabilizing member and the first end of the at least one horizontal stabilizing member may be operably coupled.

In yet another aspect, the present disclosure is directed to a flight control system for a lighter-than-air airship. The system may include one or more operator controls configured to receive operator input, a horizontal control surface associated with a horizontal stabilizing member, a vertical control surface associated with a vertical stabilizing member, a processor configured to receive an input signal from the operator controls and generate a control signal according to the input signal, and five propulsion assemblies. A first of the five propulsion assemblies may be operably coupled to a support structure associated with the airship and located at a first location on a periphery associated with the airship, a second of the five propulsion assemblies may be operably coupled to the support structure and located on the periphery at approximately 120 degrees with respect to the first directable propulsion assembly, and a third of the five propulsion assemblies may be operably coupled to the support structure and located on the periphery at approximately negative 120 degrees with respect to the first directable propulsion assembly. Further, a fourth propulsion assembly may be configured to direct a thrust along an axis substantially parallel to a roll axis of the airship and substantially co-located with the second of the at least five propulsion assemblies, and a fifth propulsion assembly may be configured to direct a thrust along an axis substantially parallel to the roll axis of the airship and substantially co-located with the third of the at least five propulsion assemblies.

BRIEF DESCRIPTION OF THE FIGURES

FIG. 5A is a schematic, plan, bottom-side view of an exemplary embodiment of an arrangement of propulsion systems associated with an LA;

DETAILED DESCRIPTION

Figure 1A:
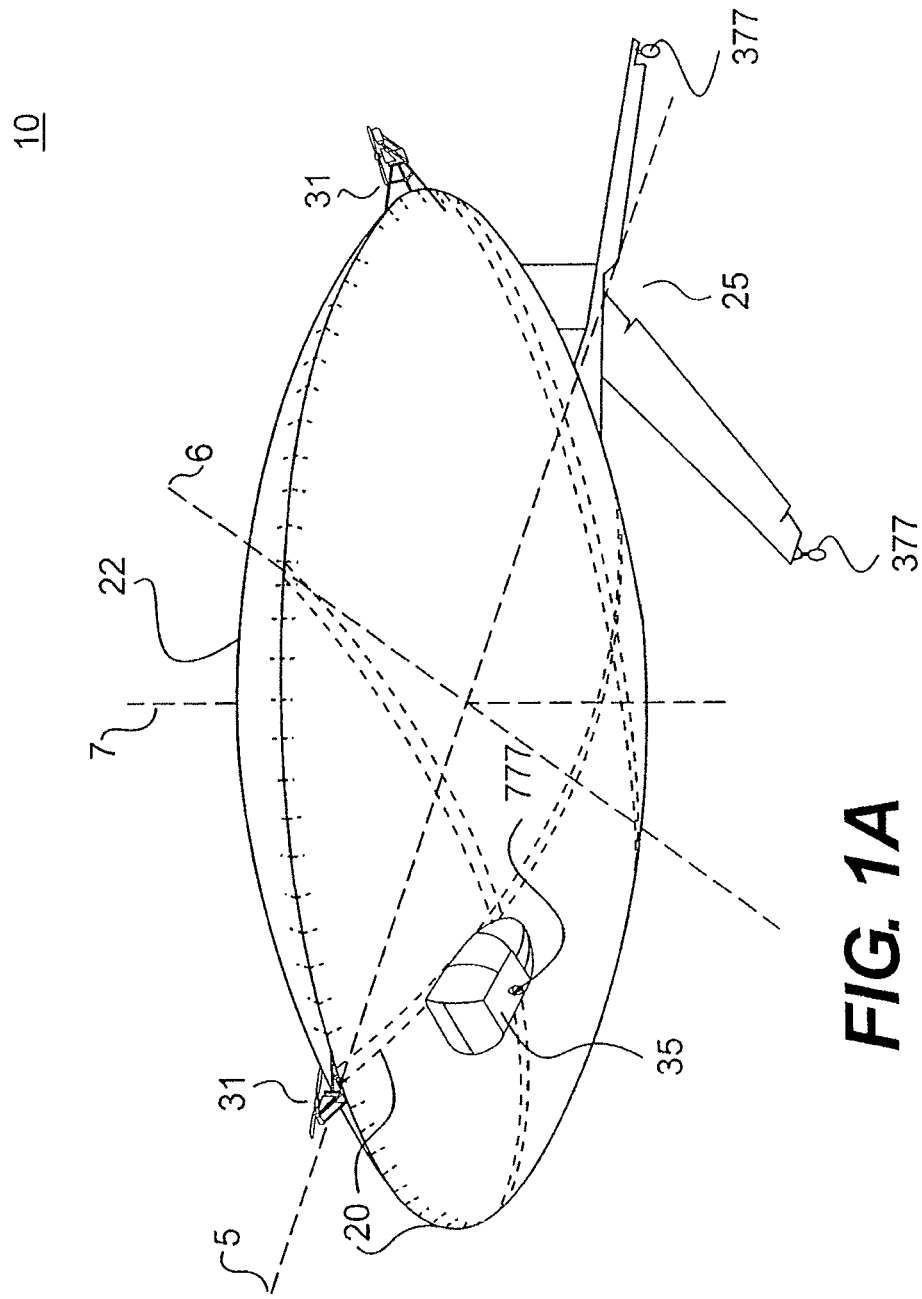
FIG. 1A is a perspective schematic view of an exemplary embodiment of a lenticular airship (LA)

FIG. 1A illustrates one exemplary embodiment of a lenticular airship (LA) 10. LA 10 may be configured for VTOL as well as navigation in three dimensions (e.g., X, Y, and Z planes). To facilitate such flight, LA 10 may include a support structure 20, a hull 22, an empennage assembly 25, rear landing gear assemblies 377, a propulsion system including propulsion assemblies 31, a gondola 35, one or more computers 600 (see, e.g., FIG. 7), and/or a front landing gear assembly 777. Throughout this discussion of various embodiments, the terms "airship" and airship may be used interchangeably to refer to various embodiments of LA 10. Further, the terms "front" and/or "fore" will be used to refer to areas within a hemisphere section of LA 10 closest to forward travel, and the term "rear" and/or "aft" will be used to refer to areas within a hemisphere section of LA 10 closest to the opposite direction of travel. Moreover, the term "tail" will be used to refer to a rear most point associated with hull 22, while the term "nose" will be used to refer to the forward most point within the front section of hull 22.

FIG. 1A further illustrates various axes relative to the exemplary LA 10 for reference purposes. LA 10 may include a roll axis 5, a pitch axis 6, and a yaw axis 7. Roll axis 5 of LA 10 may correspond with an imaginary line running through hull 22 in a direction from, for example, empennage assembly 25 to gondola 35. Yaw axis 7 of LA 10 may correspond with an imaginary line running perpendicular to roll axis through hull 22 in a direction from, for example, a bottom surface of hull 22 to a top surface of hull 22. Pitch axis 6 may correspond to an imaginary line running perpendicular to both yaw and roll axes, such that pitch axis 6 runs through hull 22 from one side of LA 10 to the other side of LA 10. "Roll axis" and "X axis;" "pitch axis" and "Y axis;" and "yaw axis" and "Z axis" may be used interchangeably throughout this discussion to refer to the various axes associated with LA 10. One of ordinary skill in the art will recognize that the terms described in this paragraph are exemplary only and not intended to be limiting.

Figure 1B:
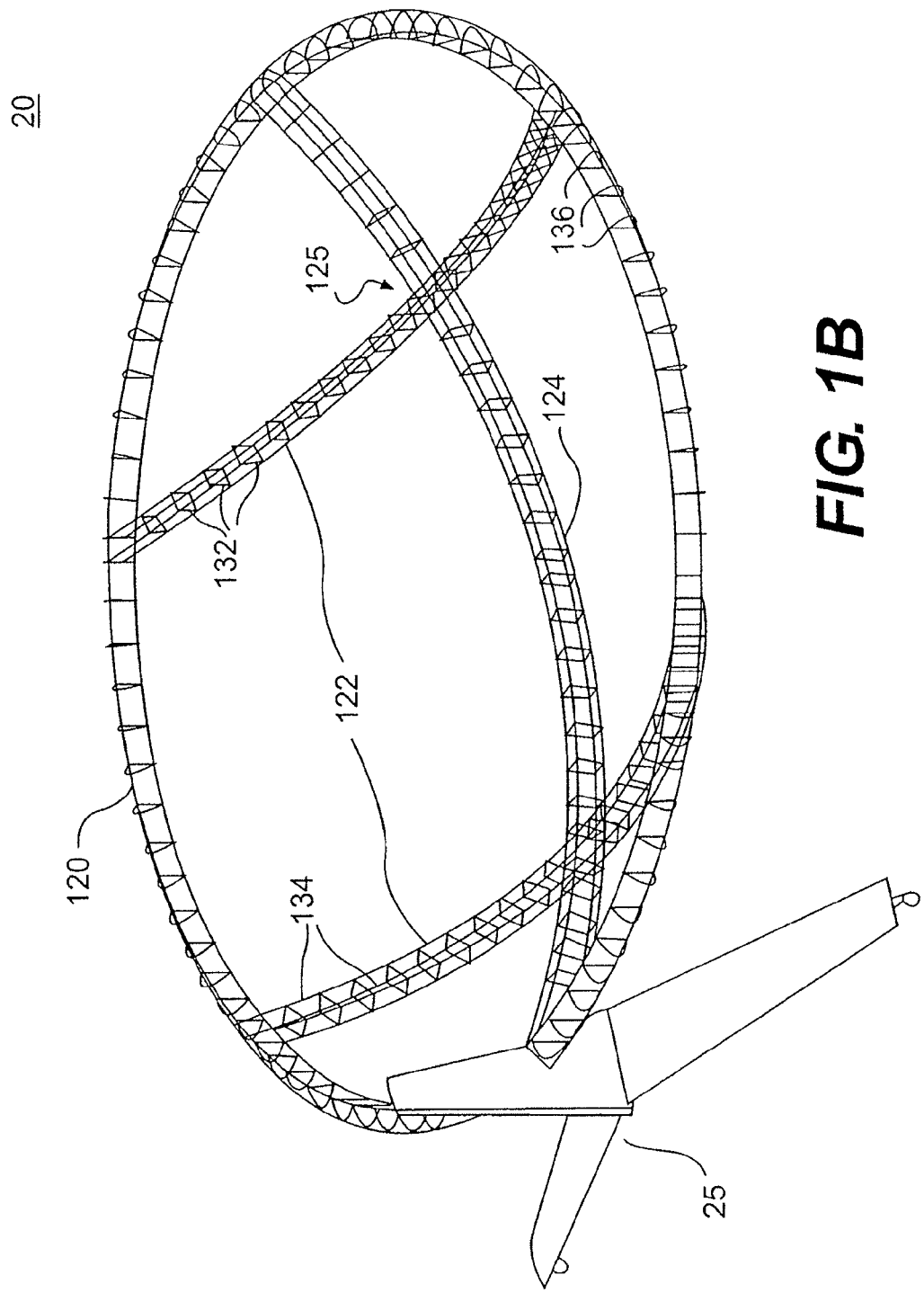
FIG. 1B is a perspective schematic view of an exemplary embodiment of a support structure.

FIG. 1B illustrates an exemplary support structure 20 according to some embodiments of the present disclosure. For example, support structure 20 may be configured to define a shape associated with LA 10, while providing support to numerous systems associated with LA 10. Such systems may include, for example, hull 22, a cabin assembly 34 (e.g., a gondola 35 or a cargo compartment, etc.), and/or propulsion assemblies 31. Support structure 20 may be defined by one or more frame members interconnected to form a desired shape. For example, according to some embodiments, a first portion of support structure 20 may define a substantially circular peripheral beam (e.g., a keel hoop 120) of a defined diameter. Keel hoop 120 may include one or more frame sections with a defined radius of curvature that may be affixed to one another to form keel hoop 120 of a desired radius. In some embodiments, keel hoop 120 may have a diameter of, for example, approximately 21 meters.

According to some embodiments, support structure 20 may include lateral frame members 122 extending substantially orthogonally from various points of keel hoop 120, at a radius of curvature into a third dimension and meeting substantially orthogonally at an opposite section of keel hoop 120, for example, as shown in FIG. 1B. Lateral frame members 122 may therefore, provide support to keel hoop 120, and may also provide support to one or more additional elements associated with LA 10 (e.g., propulsion assemblies 31).

Support structure 20 may include a longitudinal frame member 124 configured to extend in a longitudinal direction from a fore portion of keel hoop 120 to a rear portion of keel hoop 120. Longitudinal frame member 124 may meet keel hoop 120 substantially orthogonally and may be aligned at substantially a midway point associated with keel hoop 120. In other words, viewing keel hoop 120 in a two dimensional plane, longitudinal frame member 124 may intersect keel hoop 120 at relative positions of 0 degrees and 180 degrees.

As can be seen in FIG. 1B at 125, for example, a lateral frame member 122 may intersect longitudinal frame member 124 at substantially a right angle. The angle of intersection may vary according to the radius of curvature associated with both longitudinal frame member 124 and lateral frame member 122.

One or more frame members included within support structure 20 may include one or more levels of structural support. For example, in some embodiments, a rectangular and/or other polygonal shaped sub-support 132 may be provided and surrounded by one or more surrounding members 134, which may intersect polygonal sub-support 132 at a tangent suitable for creating a desired radius of curvature associated with the frame member. In some embodiments, a polygon shaped similarly to a letter "D" may be used as shown at sub-support 136. Such embodiments may be of particular use for construction of frame members associated with keel hoop 120. One of ordinary skill in the art will recognize that many different shapes may be utilized for one or more of sub-supports 132 and more or fewer levels of support may be utilized as desired. Varying sizes and shapes of frame members may be generated based on shapes associated with one or more sub-supports 132. Any such combinations are intended to fall within the scope of the present disclosure.

According to some embodiments, frame members associated with support structure 20 may be fabricated as individual pieces and assembled into final frame members for placement on support structure 20. For example, keel hoop 120 may include multiple sections of frame at a defined radius of curvature. Assembly of such frame sections may yield a keel hoop 120 with a defined radius. To fasten each frame member associated with keel hoop 120, one or more brackets may be utilized in conjunction with one or more fasteners (e.g., adhesives, bolts, nuts, screws, etc.) depending on the strength and type of joint desired. Alternatively, or in addition, frame members may be designed such that each frame member fits together while an adhesive may be used to ensure that the frame members remain assembled.

In some embodiments, six frame members may be joined for formation of keel hoop 120. Each of the six frame members may then be linked to one another with linking elements (e.g., brackets) using suitable adhesive(s) and/or fasteners. Depending on the adhesive(s) used, it may be desirable to warm the adhesive(s) to ensure polymerization and/or utilize one or more mechanical fasteners.

To maximize a lifting capacity associated with LA 10, it may be desirable to design and fabricate support structure 20 such that weight associated with support structure 20 is minimized while strength, and therefore resistance to aerodynamic forces, for example, is maximized. In other words, maximizing a strength-to-weight ratio associated with support structure 20 may provide a more desirable configuration for LA 10. For example, one or more frame members may be constructed from light weight, but high strength, materials including, for example, a substantially carbon-based material (e.g., carbon fiber) and/or aluminum, among other things.

According to some embodiments, one or more frame members may be constructed, including a carbon fiber/resin composite and honeycomb-carbon sandwich. The honeycomb-carbon sandwich may further include a carbon mousse or foam type material. In such an embodiment, individual frame members associated with support structure 20 may be fabricated in an appropriate size and shape for assembly within support structure 20. Such construction may lead to a desirable strength-to-weight ratio for support structure 20. In some embodiments, it may be desirable to fabricate support structure 20 such that an associated mass is less than, for example, 200 kilograms.

Hull 22 may include multiple layers/envelopes and/or may be of a semi-rigid construction. Further, hull 22 may be substantially oblate spheroid, or "lenticular" in shape. For example, the dimensions of an oblate spheroid shape may be approximately described by the representation A=B>C, where A is a length dimension (e.g., along roll axis 5); B is a width dimension (e.g., along pitch axis 6); and C is a height dimension (e.g., along yaw axis 7) of an object. In other words, an oblate spheroid may have an apparently circular planform with a height (e.g., a polar diameter) less than the diameter of the circular planform (e.g., an equatorial diameter). For example, according to some embodiments, hull 22 may include dimensions as follows: A=21 meters; B=21 meters; and C=7 meters. Dimensions associated with hull 22 may also define, at least in part, a volume of lighter-than-air gas that may be retained within hull 22. For example, using the dimensions given above for hull 22, an uncompressed internal volume associated with hull 22 may be approximately 1275 cubic meters.

Figure 2:
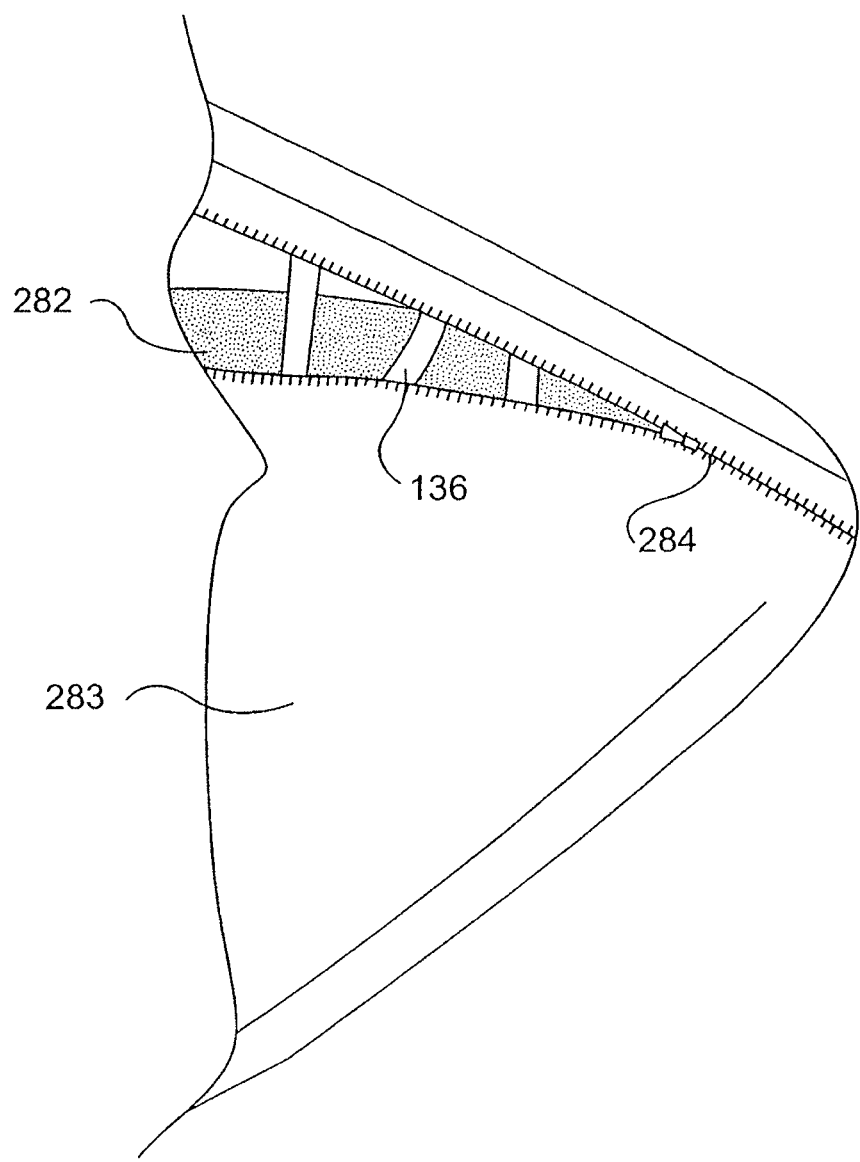
FIG. 2 is a schematic, perspective view of an exemplary embodiment of a hull.

FIG. 2 is a schematic illustration of an exemplary embodiment of hull 22 consistent with the present disclosure. Hull 22 may be configured to retain a volume of lighter-than-air gas and may be fabricated such that, upon retention of the volume of gas, a substantially lenticular and/or oblate spheroid shape results. Therefore, hull 22 may include a first envelope 282 sewn or otherwise assembled of fabric or material configured to retain a lighter-than-air gas and/or having a circular planform with a maximum thickness less than the diameter of the circular planform. First envelope 282 may be fabricated from materials including, for example, aluminized plastic, polyurethane, polyester, laminated latex, and any other material suitable for retaining a lighter-than-air gas. In some embodiments, first envelope 282 may be fabricated from one or more polyester sheets and may be sewn or otherwise shaped such that retention of a volume of lighter-than-air gas causes first envelope 282 to assume the shape of an oblate spheroid.

First envelope 282 associated with hull 22 may be configured to be fastened to support structure 20 such that support structure 20 may provide support to hull 22. First envelope 282 may be fastened to support structure 20 at suitable locations and via any suitable method including, for example, zippers, tie-downs, snaps, etc. According to some embodiments, a zipper belt 284 may be provided around the periphery of keel hoop 120 with a matching zipper segment surrounding the periphery of first envelope 282. The zipper segments may then be "zipped" together, such that first envelope 282 is fastened to keel hoop 120. First envelope 282 may remain within the periphery of keel hoop 120 and within the area defined by support structure 20.

Lighter-than-air lifting gasses for use within first envelope 282 of hull 22 may include, for example, helium, hydrogen, methane, and ammonia, among others. The lift force potential of a lighter-than-air gas may depend on the density of the gas relative to the density of the surrounding air or other fluid (e.g., water). For example, the density of helium at 0 degrees Celsius and 101.325 kilo-Pascals may be approximately 0.1786 grams/liter, while the density of air at 0 degrees C. and 101.325 kilo-Pascals may be approximately 1.29 g/L. Neglecting the weight of a retaining envelope, equation 1 illustrates a simplified formula for calculating a buoyant force $F_{buoyant}$ based on volume of a lighter-than-air gas, where $D_f$ is a density associated with an ambient fluid, $D_{lta}$ is a density associated with the lighter-than-air gas, $g_c$ is the gravity constant, and V is the volume of the lighter-than-air gas.

$$F_{buoyant} = (D_f - D_{lta}) * g_c * V \quad (1)$$

Simplifying the equation based on a volume of helium suspended within air at 0 degrees C. and 101.325 kilo-Pascals, a buoyant force may be determined to be approximately $F_{buoyant}/g_c = 1.11$ grams per liter (i.e., approximately 1 kg per cubic meter of helium). Therefore, based on the lighter-than-air gas chosen, an internal volume of first envelope 282 associated with hull 22 may be selected such that a desired amount of lift force is generated by a volume of lighter-than-air gas. Equation 2 may be utilized to calculate such a desired volume for aerostatic lift, taking into account the mass, M, of LA 10.

$$V > M/(D_f - D_{lta}) \quad (2)$$

According to some embodiments, first envelope 282 associated with hull 22 may be divided by a series of "walls" or dividing structures (not shown) within first envelope 282. These walls may create separated "compartments" that may each be filled with a lighter-than-air lifting gas individually. Such a configuration may mitigate the consequences of the failure of one or more compartments (e.g., a leak or tear in the fabric) such that LA 10 may still possess some aerostatic lift upon failure of one or more compartments. In some embodiments, each compartment may be in fluid communication with at least one other compartment, and such walls may be fabricated from materials similar to those used in fabrication of first envelope 282, or, alternatively (or in addition), different materials may be used.

According to some embodiments, first envelope 282 may be divided into four compartments using "walls" created from fabric similar to that used to create first envelope 282. One of skill in the art will recognize that more or fewer compartments may be utilized as desired.

One or more of the compartments within first envelope 282 may include one or more fill and/or relief valves (not shown) configured to allow filling of first envelope 282, which may result in minimizing the risk of over-inflation of first envelope 282. Such valves may be designed to allow entry of a lighter-than-air gas as well as allowing a flow of lighter-than-air gas to flow out of first envelope 282 upon an internal pressure reaching a predetermined value (e.g., about 150 to 400 Pascals). One of skill in the art will recognize that more or fewer fill/relief valves may be used as desired and that relief pressures may be selected based on materials associated with first envelope 282, among other things.

In addition to aerostatic lift generated by retention of a lighter-than-air gas, hull 22 may be configured to generate at least some aerodynamic lift when placed in an airflow (e.g., LA 10 in motion and/or wind moving around hull 22) based on an associated angle of attack and airflow velocity relative to the airship. Hull 22 may therefore include a second envelope 283 configured to conform substantially to a shape associated with first envelope 282. Second envelope 283 associated with hull 22 may, for example, substantially surround both top and bottom surfaces of first envelope 282, or alternatively, second envelope 283 may be formed by two or more pieces of material, each substantially covering only a portion of the top and/or bottom surface of hull 22. For example, according to some embodiments, second envelope 283 may closely resemble first envelope 282, but contain a slightly larger volume, such that second envelope 283 may substantially surround support structure 20 and first envelope 282 associated with hull 22.

In some embodiments, a first portion of second envelope 283 may be configured to cover only the bottom half of support structure 20 (e.g., as shown in FIG. 2) while a second portion of second envelope 283 may be placed over the top half of first envelope 282. In such embodiments, the first portion of second envelope 283 may be positioned below support structure 20 and the edges of second envelope 283 brought to an outside periphery of keel hoop 120 for fastening (e.g., zipping) to keel hoop 120. The second portion of second envelope 283 may then be draped over the top surface of first envelope 282 and the edges brought to an outside periphery of keel hoop 120 for fastening (e.g., zipping) to keel hoop 120. Fastening of second envelope 283 to keel hoop 120 may be accomplished in a similar fashion to that used for first envelope 282. For example, zipper belt 284 surrounding the periphery of keel hoop 120 may have a second zipper that may meet with a zipper segment on second envelope 283 such that they may be "zipped" together. Alternatively, any other suitable fastening method may be used (e.g., tie-downs).

Second envelope 283 may provide a transfer of lift forces acting on second envelope 283 to longitudinal frame member 124, lateral frame members 122, and keel hoop 120. Second envelope 283 may include canvass, vinyl, and/or other suitable material that may be sewn or otherwise crafted into a suitable shape, which may possess a desired resistance to external stresses (e.g., tears, aerodynamic forces, etc.). In some embodiments, second envelope 283 may include a low drag and/or low weight fabric such as, for example, polyester, polyurethane, and/or DuPont™ Teller®, having a thermoplastic coating.

In addition to providing aerodynamic lift force transfer to support structure 20 and potential tear resistance, upon installation of second envelope 283, a space may be created between first envelope 282 and second envelope 283, which may be utilized as a ballonet for LA 10. For example, a ballonet may be used to compensate for differences in pressure between a lifting gas within first envelope 282 and the ambient air surrounding LA 10, as well as for ballasting of an airship. The ballonet may therefore allow hull 22 to maintain its shape when ambient air pressure increases (e.g., when LA 10 descends). The ballonet may also help control expansion of the lighter-than-air gas within first envelope 282 (e.g., when LA 10 ascends), substantially preventing bursting of first envelope 282 at higher altitudes. Pressure compensation may be accomplished, for example, by pumping air into, or venting air out of, the ballonet as LA 10 ascends and descends, respectively. Such pumping and venting of air may be accomplished via air pumps, vent tabs, or other suitable devices (e.g., action of the propulsion system 30) associated with hull 22. For example, in some embodiments, as LA 10 ascends, air pumps (e.g., an air compressor) may fill the space between first envelope 282 and second envelope 283 with air such that a pressure is exerted on first envelope 282, thereby restricting its ability to expand in response to decreased ambient pressure. Conversely, as LA descends, air may be vented out of the ballonet, thereby allowing first envelope 282 to expand and assisting hull 22 in maintaining its shape as ambient pressure increases on hull 22.

Figure 3A:
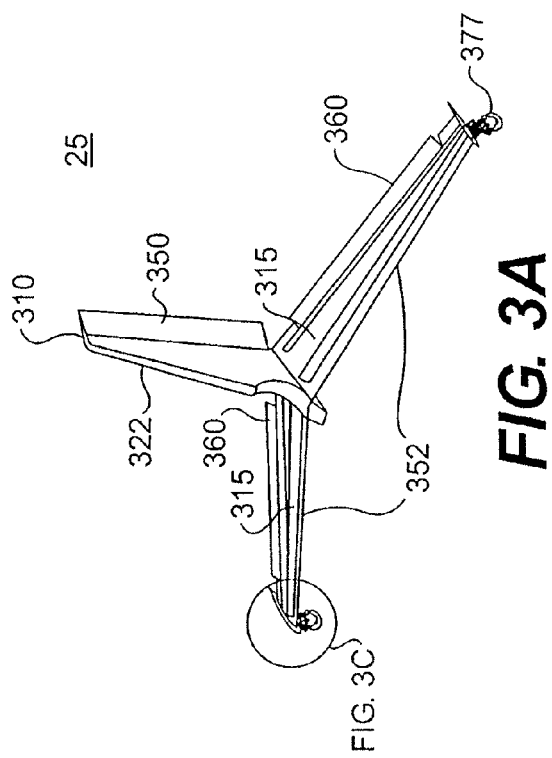
FIG. 3A is a schematic, perspective view of an exemplary embodiment of an empennage assembly.

FIG. 3A illustrates an exemplary empennage assembly 25. Empennage assembly 25 may be configured to provide stabilization and/or navigation functionality to LA 10. Empennage assembly 25 may be operatively connected to support structure 20 via brackets, mounts, and/or other suitable methods. For example, in some embodiments, an empennage mount 345 similar to that shown in FIG. 3B may be used for operatively connecting empennage assembly 25 to longitudinal frame member 124 and keel hoop 120.

According to some embodiments, empennage assembly 25 may include a vertical stabilizing member 310 and horizontal stabilizing members 315. Vertical stabilizing member 310 may be configured as an airfoil to provide LA 10 with stability and assistance in yaw/linear flight control. Vertical stabilizing member 310 may include a leading edge, a trailing edge, a pivot assembly, one or more spars, and one or more vertical control surfaces 350 (e.g., a rudder).

Vertical stabilizing member 310 may be pivotally affixed to a point on empennage assembly 25. During operation of LA 10, vertical stabilizing member 310 may be directed substantially upward from a mounting point of empennage assembly 25 to support structure 20 while the upper-most point of vertical stabilizing member 310 remains below or substantially at the same level as the uppermost point on the top surface of hull 22. Such a configuration may allow vertical stabilizing member 310 to maintain isotropy associated with LA 10. Under certain conditions (e.g., free air docking, high winds, etc.), vertical stabilizing member 310 may be configured to pivot about a pivot assembly within a vertical plane such that vertical stabilizing member 310 comes to rest in a horizontal or downward, vertical direction, and substantially between horizontal stabilizing members 315. Such an arrangement may further enable LA 10 to maximize isotropy relative to a vertical axis, thereby minimizing the effects of adverse aerodynamic forces, such as wind cocking with respect to vertical stabilizing member 310. In some embodiments consistent with the present disclosure, where hull 22 includes a thickness dimension of 7 meters and where empennage assembly 25 is mounted to keel hoop 120 and longitudinal frame member 124, vertical stabilizing member 310 may have a height dimension ranging from about 3 meters to about 4 meters.

Vertical stabilizing member 310 may include one or more spars (not shown) configured to define the planform of vertical stabilizing member 310 as well as provide support for a skin associated with vertical stabilizing member 310. The one or more spars may include a substantially carbon-based material, such as, for example, a carbon fiber honeycomb sandwich with a carbon fiber mousse. Each of the one or more spars may have openings (e.g., circular cutouts) at various locations, such that weight is minimized, with minimal compromise in strength. One of ordinary skill in the art will recognize that minimizing the number of spars used, while still ensuring desired structural support may allow for minimizing weight associated with vertical stabilizing member 310. Therefore, the one or more spars may be spaced along the span of vertical stabilizing member 310 at a desired interval configured to maximize support while minimizing weight.

A leading edge 322 may be utilized for defining an edge shape of vertical stabilizing member 310 as well as securing the spars prior to installation of a skin associated with vertical stabilizing member 310. Leading edge 322 may also include a substantially carbon-based material, such as a carbon fiber honeycomb sandwich with a carbon fiber mousse.

Leading edge 322 and the one or more spars may be aligned and fastened in place with a skin installed substantially encasing leading edge 322 and spars. The skin may include, for example, canvass, polyester, nylon, thermoplastics, and any other suitable material. The skin may be secured using adhesives, shrink wrap methods, and/or any other suitable method for securing the skin to leading edge 322 and the one or more spars.

For example, in some embodiments, a canvass material may be applied over the one or more spars and leading edge 322 then secured using an adhesive and/or other suitable fastener. The canvass material may then be coated with a polyurethane and/or thermoplastic material to further increase strength and adhesion to the one or more spars and leading edge 322.

Figure 3C:
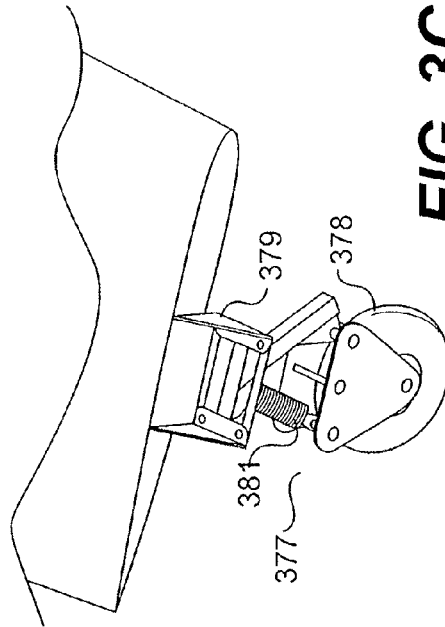
FIG. 3C is a schematic, partial perspective view of an exemplary embodiment of a rear landing gear assembly configuration.

Vertical stabilizing member 310 may also include one or more vertical control surfaces 350 configured to manipulate airflow around vertical stabilizing member 310 for purposes of controlling LA 10. For example, vertical stabilizing member 310 may include a rudder configured to exert a side force on vertical stabilizing member 310 and thereby, on empennage mount 345 and hull 22. Such a side force may be used to generate a yawing motion about yaw axis 7 of LA 10, which may be useful for compensating for aerodynamic forces during flight. Vertical control surfaces 350 may be operatively connected to vertical stabilizing member 310 (e.g., via hinges) and may be communicatively connected to systems associated with gondola 35 (e.g., operator pedals) or other suitable location. For example, communication may be established mechanically (e.g., cables) and/or electronically (e.g., wires and servo motors 346 and/or light signals) with gondola 35 or other suitable location (e.g., remote control). In some embodiments, vertical control surfaces 350 may be configured to be operated via a mechanical linkage 351. In some cases, mechanical linkage 351 may be operably connected to one or more servo motors 346, as shown in FIGS. 3A and 3D.

Horizontal stabilizing members 315 associated with empennage assembly 25 may be configured as airfoils and may provide horizontal stability and assistance in pitch control of LA 10. Horizontal stabilizing members 315 may include a leading edge, a trailing edge, one or more spars, and one or more horizontal control surfaces 360 (e.g., elevators).

In some embodiments, horizontal stabilizing members 315 may be mounted on a lower side of hull 22 in an anhedral (also known as negative or inverse dihedral) configuration. In other words, horizontal stabilizing members 315 may extend away from vertical stabilizing member 310 at a downward angle relative to roll axis 5. The anhedral configuration of horizontal stabilizing members 315 may allow horizontal stabilizing members 315 to act as ground and landing support for a rear section of LA 10. Alternatively, horizontal stabilizing members 315 may be mounted in a dihedral or other suitable configuration.

According to some embodiments, horizontal stabilizing members 315 may be operatively affixed to empennage mount 345 and/or vertical stabilizing member 310. Under certain conditions (e.g., free air docking, high winds, etc.) horizontal stabilizing members 315 may be configured to allow vertical stabilizing member 310 to pivot within a vertical plane, such that vertical stabilizing member 310 comes to rest substantially between horizontal stabilizing members 315.

In some embodiments, a span (i.e., tip-to-tip measurement) associated with horizontal stabilizing members 315 may be approximately 10 to 20 meters across, depending on a desired size of hull 22. In some embodiments, a span associated with horizontal stabilizing members 315 may be, for example, approximately 14.5 meters. Horizontal stabilizing members 315 may include one or more spars (not shown) configured to define the planform of horizontal stabilizing members 315 as well as provide support for a skin associated with horizontal stabilizing members 315. The one or more spars may include a substantially carbon-based material, such as a carbon fiber honeycomb sandwich with a carbon fiber mousse. Each of the one or more spars may have openings (e.g., circular cutouts) at various locations, such that weight is minimized with minimal compromise in strength. One of ordinary skill in the art will recognize that minimizing the number of spars used, while still ensuring desired structural support may allow for minimizing weight associated with horizontal stabilizing members 315. Therefore, spars may be spaced along the span of horizontal stabilizing members 315 at a desired interval configured to maximize support while minimizing weight.

A leading edge 352 may be utilized for defining an edge shape of horizontal stabilizing members 315 as well as securing each spar prior to installation of a skin associated with horizontal stabilizing members 315. Leading edge 352 may also include a substantially carbon-based material, such as a carbon fiber honeycomb sandwich with a carbon fiber mousse to obtain a desirable strength-to-weight ratio. Once leading edge 352 and the one or more spars have been aligned and fastened in place, a skin may be installed substantially encasing leading edge 352 and the one or more spars. Skin materials may include, for example, canvass, polyester, nylon, thermoplastics, and/or any other suitable material. The skin may be secured using adhesives, shrink wrap methods, and/or any other suitable method. For example, in some embodiments, a canvass material may be applied over the one or more spars and leading edge 352 and secured using an adhesive, and/or other suitable fastener. The canvass material may then be coated with a polyurethane and/or thermoplastic material to further increase strength and adhesion to spars and leading edge 352.

Horizontal stabilizing members 315 may also include one or more horizontal control surfaces 360 (e.g., elevators) configured to manipulate airflow around horizontal stabilizing members 315 to accomplish a desired effect. For example, horizontal stabilizing members 315 may include elevators configured to exert a pitching force (i.e., up or down force) on horizontal stabilizing members 315. Such a pitching force may be used to cause motion of LA 10 about pitch axis 6. Horizontal control surfaces 360 may be operatively connected to horizontal stabilizing members 315 (e.g., via hinges) and may be mechanically (e.g., via cables) and/or electronically (e.g., via wires and servo motors 347 and/or light signals) controlled from gondola 35 or other suitable location (e.g., remote control). In some embodiments, horizontal control surfaces 360 may be configured to be operated via a mechanical linkage 349. In some cases, mechanical linkage 349 may be operably connected to one or more servo motors 347, as shown in FIG. 3A.

Figure 3B:
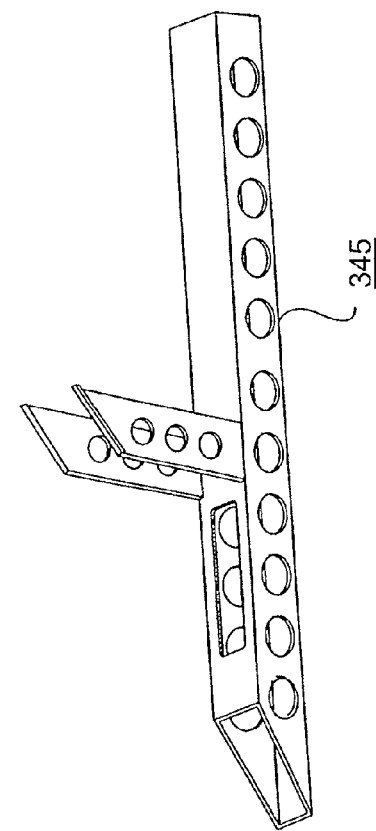
FIG. 3B is a schematic, partial perspective view of an exemplary empennage mount.
Figure 3D:
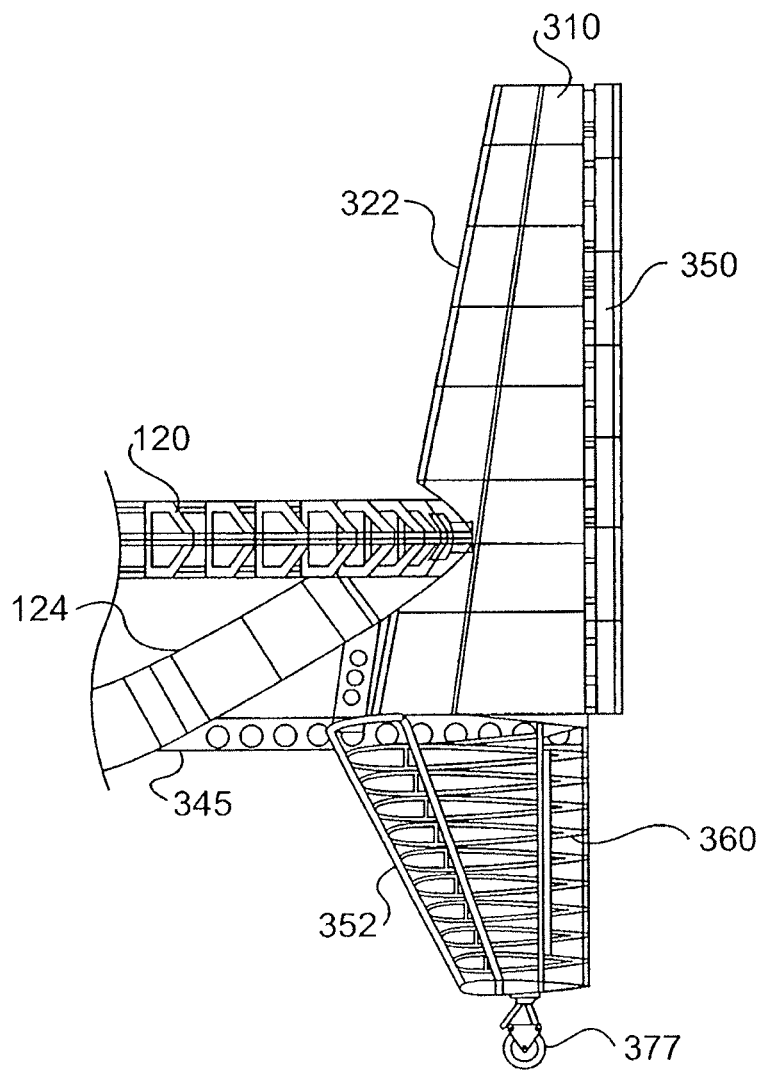
FIG. 3D is a schematic view highlighting an exemplary mounting configuration between an exemplary empennage, keel hoop, and longitudinal support member, utilizing an exemplary empennage mount.

FIG. 3B is an illustration of an exemplary embodiment of empennage mount 345. Empennage mount 345 may be configured to operatively connect vertical stabilizing member 310, horizontal stabilizing members 315, and support structure 20. Empennage mount 345 may include similar high-strength, low-weight materials discussed with reference to support structure 20 (e.g., carbon fiber honeycomb sandwich). Further, empennage mount 345 may include fastening points configured to mate with fastening points present on support structure 20. For example, longitudinal frame member 124 and/or keel hoop 120 may be configured with fastening points near a rear location of keel hoop 120 (e.g., at approximately 180 degrees around keel hoop 120). Such fastening points may be configured to mate with fastening points provided on empennage mount 345. One of ordinary skill in the art will recognize that numerous fastener combinations may be utilized for fastening empennage mount 345 to the related fastening points of heel hoop 220 and longitudinal frame member 124.

Empennage mount 345 also may be configured to enable pivoting of vertical stabilizing member 310 such that vertical stabilizing member 310 may be placed in a position between horizontal stabilizing members 315 when desired. Empennage mount 345 may include pins, hinges, bearings, and/or other suitable devices to enable such a pivoting action. In some embodiments, vertical stabilizing member 310 may be mounted on a swivel pin (not shown) associated with empennage mount 345 and may include a latching mechanism (not shown) configured to operatively connect vertical stabilizing member 310 to keel hoop 120 and/or other suitable location. Latching mechanism (not shown) may include hawksbill latches, slam latches, spring loaded pins, striker plates, hydraulic actuators, and/or any other combination of suitable mechanisms. Control of latching mechanism (not shown) and pivoting of vertical stabilizing member 310 may be achieved utilizing mechanical (e.g., via cables) and/or electrical (e.g., via control signals and servo motors 348), or any other suitable control methods (e.g., via hydraulics).

When, for example, horizontal stabilizing members 315 are configured in an anhedral arrangement (i.e., angled downward away from hull 22) and are connected to a lower side of LA 10, horizontal stabilizing members 315 may function as ground and landing support for a rear section of LA 10. To facilitate such functionality, rear landing gear assembly 377 may be operatively connected to each airfoil associated with horizontal stabilizing members 315 (e.g., as shown in FIG. 3C). Rear landing gear assembly 377 may include one or more wheels 378, one or more shock absorbers 381, and mounting hardware 379. Rear landing gear assemblies 377 may be connected to horizontal stabilizing members 315 at a tip end and/or any other suitable location (e.g., a midpoint of horizontal stabilizing members 315). In some embodiments, rear landing gear assembly 377 may include a single wheel mounted on an axle operatively connected via oleo-pneumatic shock-absorbers to horizontal stabilizing members 315 at an outer-most tip of each airfoil. Such a configuration may allow rear landing gear assembly 377 to provide a damping force in relation to an input (e.g., forces applied during touchdown and landing). Horizontal stabilizing member 315 may further assist in such damping based on configuration and materials used. One of ordinary skill in the art will recognize that rear landing gear assemblies 377 may include more or fewer elements as desired.

Rear landing gear assembly 377 may be configured to perform other functions including, for example, retracting, extending, and/or adjusting for a load associated with LA 10. One of ordinary skill in the art will recognize that numerous configurations may exist for rear landing gear assembly 377 and any such configuration is meant to fall within the scope of this disclosure.

FIG. 3D is a schematic view highlighting an exemplary mounting configuration between empennage 25, keel hoop 120, and longitudinal support member 124, utilizing empennage mount 345. One of ordinary skill in the art will recognize that numerous other mounting configurations may be utilized and are intended to fall within the scope of the present disclosure.

Figure 4A:
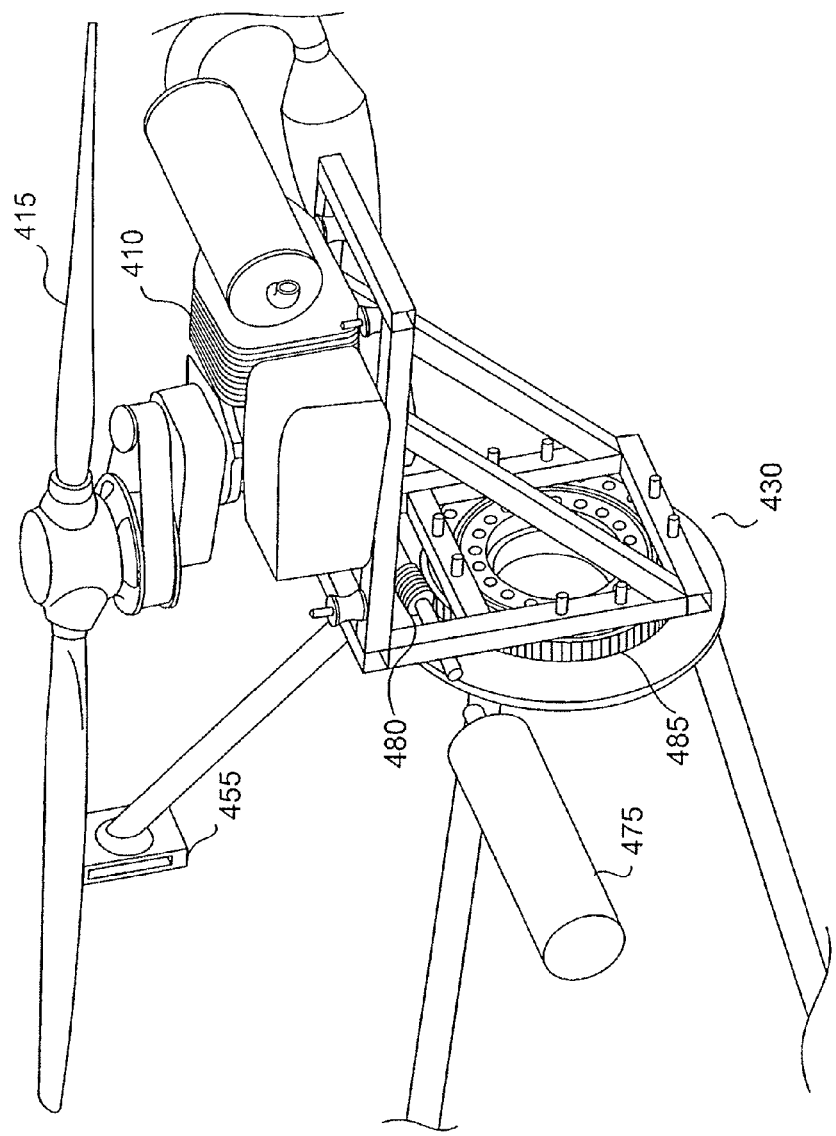
FIG. 4A is a schematic, partial perspective view of an exemplary embodiment of a propulsion assembly.
Figure 4B:
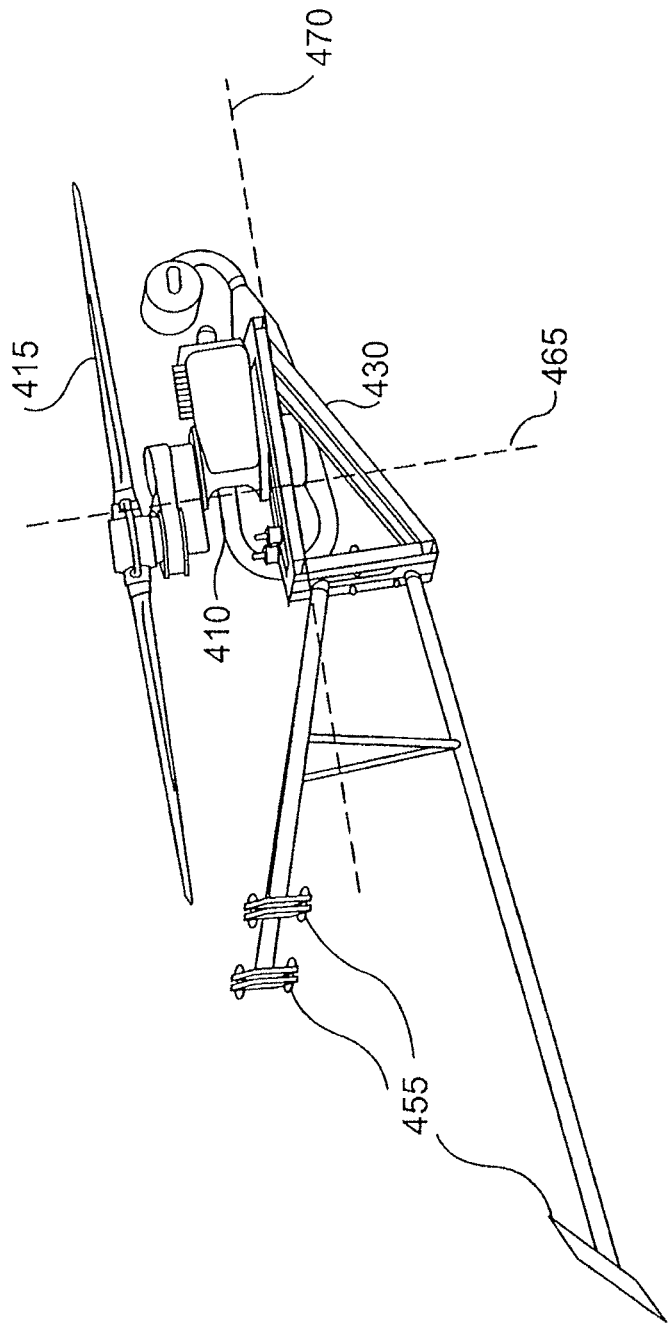
FIG. 4B is another schematic, partial perspective view of an exemplary embodiment of a propulsion assembly.
Figure 4C:
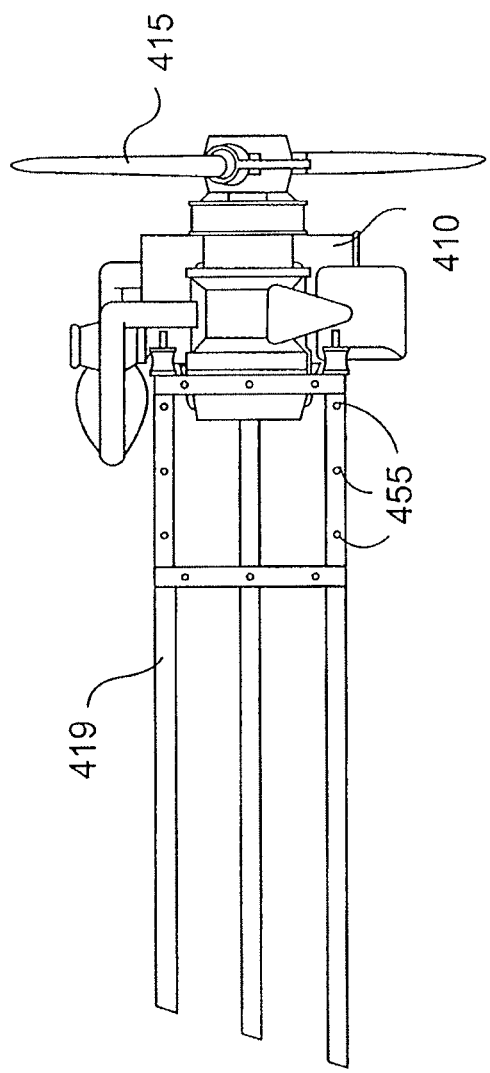
FIG. 4C is yet another schematic, partial perspective view of an exemplary embodiment of a propulsion assembly.
Figure 7:
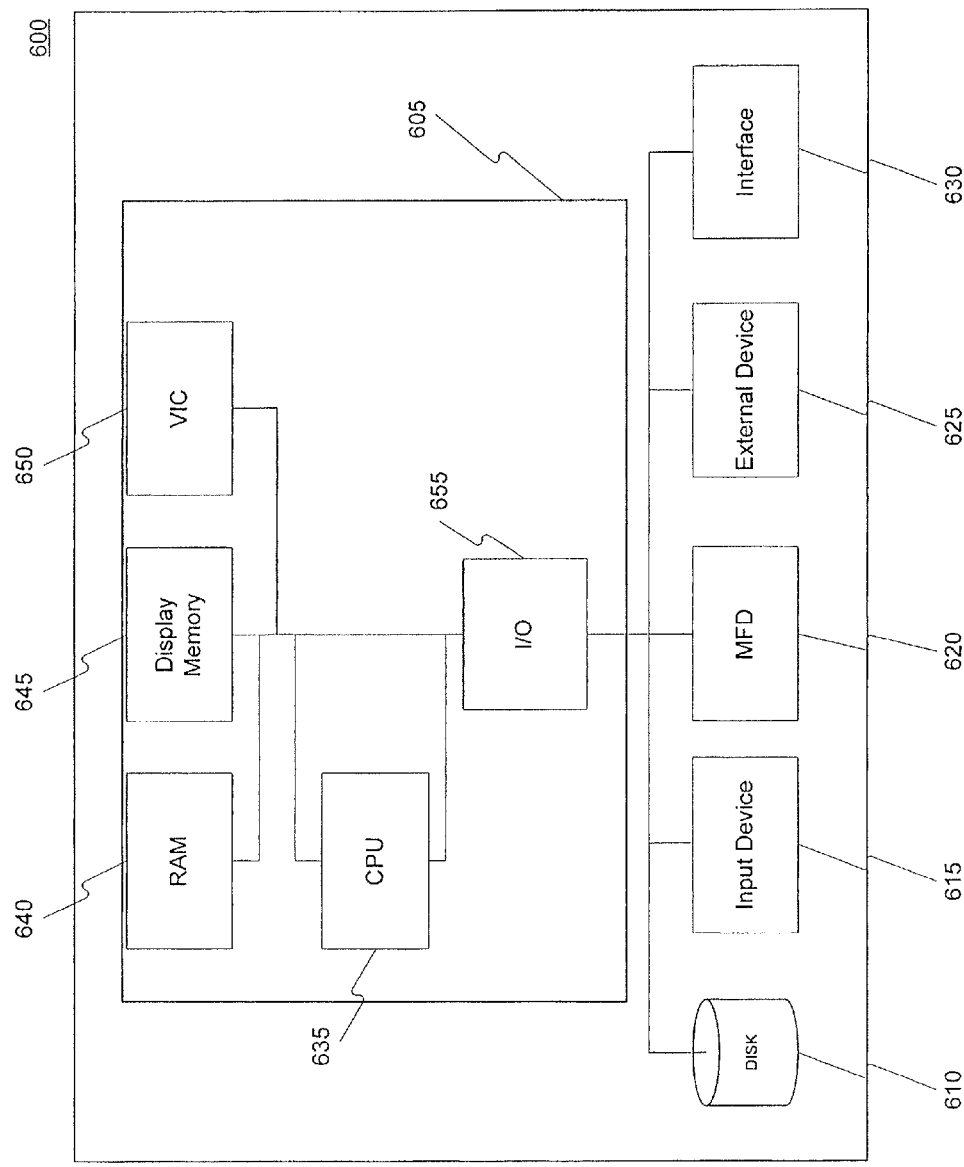
FIG. 7 is a block diagram of an exemplary embodiment of a computer.

FIGS. 4A-4C illustrate various exemplary embodiments of propulsion assemblies 31. For example, as shown in FIG. 4A, propulsion assemblies 31 may include a power source 410, a power conversion unit 415, a propulsion unit mount 430, and/or a fuel source (e.g., a tank) (not shown). Power source 410 may include, for example, electric motors, liquid fuel motors, gas turbine engines, and/or any suitable power source configured to generate rotational power. Power source 410 may further include variable-speed and/or reversible type motors that may be run in either direction (e.g., rotated clockwise or counterclockwise) and/or at varying rotational speeds based on control signals (e.g., signals from computer 600 (e.g., as shown in FIG. 7)). Power source 410 may be powered by batteries, solar energy, gasoline, diesel fuel, natural gas, methane, and/or any other suitable fuel source. In some embodiments, for example, power source 410 may include a Mini 2 and/or a Mini 3 motor manufactured by Simonyi Flying, Via per Marino, 4303, 41010-San Dalmatia did Serramazzoni (MO), Italy.

According to some embodiments, propulsion assemblies 31 may include a power conversion unit 415 configured to convert the rotational energy of power source 410 into a thrust force suitable for acting on LA 10. For example, power conversion unit 415 may include an airfoil or other device that when rotated may generate an airflow or thrust. For example, power conversion unit 415 may be arranged as an axial fan (e.g., propeller), a centrifugal fan, and/or a tangential fan. Such exemplary fan arrangements may be suited to transforming rotational energy produced by power source 410 into a thrust force useful for manipulating LA 10. Alternatively, where a power source such as a gas turbine engine is utilized, thrust may be provided without use of power conversion unit 415. One of ordinary skill in the art will recognize that numerous configurations may be utilized without departing from the scope of the present disclosure.

Power conversion unit 415 may be adjustable such that an angle of attack of power conversion unit 415 may be modified. This may allow for modification to thrust intensity and direction based on the angle of attack associated with power conversion unit 415. For example, where power conversion unit 415 is configured as an adjustable airfoil (e.g., variable-pitch propellers), power conversion unit 415 may be rotated through 90 degrees to accomplish a complete thrust reversal. Power conversion unit 415 may be configured with, for example, vanes, ports, and/or other devices, such that a thrust generated by power conversion unit 415 may be modified and directed in a desired direction. Alternatively (or in addition), direction of thrust associated with power conversion unit 415 may be accomplished via manipulation of propulsion unit mount 430.

As shown in FIG. 4B, for example, propulsion unit mount 430 may be operatively connected to support structure 20 and may be configured to hold a power source 410 securely, such that forces associated with propulsion assemblies 31 may be transferred to support structure 20. For example, propulsion unit mount 430 may include fastening points 455 designed to meet with a fastening location on keel hoop 120, horizontal stabilizing members 315, lateral frame member 122, and/or any other suitable location. Such locations may include structural reinforcement for assistance in resisting forces associated with propulsion assemblies 31 (e.g., thrust forces). Additionally, propulsion unit mount 430 may include a series of fastening points designed to match fastening points on a particular power source 410. One of ordinary skill in the art will recognize that an array of fasteners may be used for securing fastening points to obtain a desired connection between propulsion unit mount 430 and a fastening location.

According to some embodiments, propulsion unit mount 430 may include pivot assemblies configured to allow a rotation of propulsion assemblies 31 about one or more axes (e.g., axes 465 and 470) in response to a control signal provided by, for example, computer 600 (see, e.g., FIG. 7). Pivot assemblies may include worm gears, bevel gears, bearings, motors, and/or other devices that may facilitate controlled rotation about one or more axes of propulsion assemblies 31. In such embodiments, an electric motor 475 may be configured to cause rotation of an associated worm gear 480. Rotation of worm gear 480 may then cause rotation of propulsion mount gear 485, thereby rotating propulsion mount 430.

Alternatively, in some embodiments, propulsion assemblies 31 may be mounted such that minimal rotation or pivoting may be enabled (e.g., substantially fixed) as shown in FIG. 4C. Such a configuration may be utilized for one or more of propulsion assemblies 31, as desired.

Figure 5B:
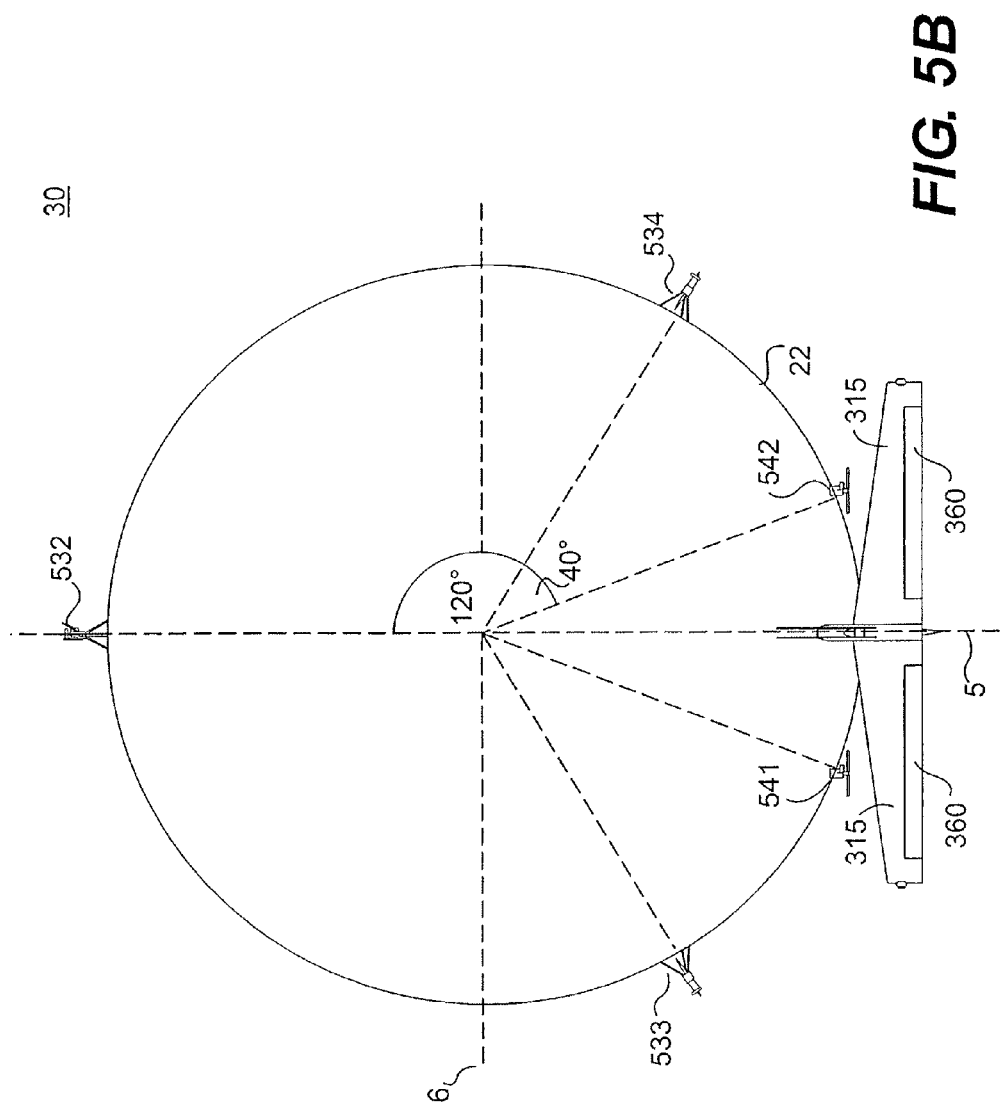
FIG. 5B is a schematic, plan, bottom-side view of another exemplary embodiment of an arrangement of propulsion systems associated with an LA.

FIGS. 5A and 5B illustrate exemplary configurations (viewed from the bottom of LA 10) of a propulsion system associated with LA 10 consistent with the present disclosure. Propulsion assemblies 31 associated with LA 10 may be configured to provide a propulsive force (e.g., thrust), directed in a particular direction (i.e., a thrust vector), and configured to generate motion (e.g., horizontal motion), counteract a motive force (e.g., wind forces), and/or other manipulation of LA 10 (e.g., yaw control). For example, propulsion assemblies 31 may enable yaw, pitch, and roll control as well as providing thrust for horizontal and vertical motion. Such functionality may depend on placement and power associated with propulsion assemblies 31. Functions associated with propulsion system 30 may be divided among a plurality of propulsion assemblies 31 (e.g., 5 propulsion assemblies 31). For example, propulsion assemblies 31 may be utilized for providing a lift force for a vertical take-off such that the forces of the lighter-than-air gas within first envelope 282 are assisted in lifting by a thrust force associated with the propulsion assemblies 31. Alternatively (or in addition), propulsion assemblies 31 may be utilized for providing a downward force for a landing maneuver such that the forces of the lighter-than-air gas within first envelope 282 are counteracted by a thrust force associated with the propulsion assemblies 31. In addition, horizontal thrust forces may also be provided by propulsion assemblies 31 for purposes of generating horizontal motion (e.g., flying) associated with LA 10.

It may be desirable to utilize propulsion assemblies 31 for controlling or assisting in control of yaw, pitch, and roll associated with LA 10. For example, as shown in FIG. 5A, propulsion system 30 may include a fore propulsion assembly 532 operatively affixed to a fore section of keel hoop 120 and substantially parallel to and/or on roll axis 5 of LA 10. In addition to fore propulsion assembly 532, propulsion system 30 may include a starboard propulsion assembly 533 operatively affixed to keel hoop 120 at approximately 120 degrees relative to roll axis 5 of LA 10 and a port propulsion assembly 534 operatively affixed to keel hoop 120 at approximately negative 120 degrees (e.g., positive 240 degrees) relative to roll axis 5 of LA 10. Such a configuration may enable control of yaw, pitch, and roll associated with LA 10. For example, where it is desired to cause a yawing movement of LA 10, fore propulsion assembly 532 may be rotated or pivoted such that a thrust vector associated with fore propulsion assembly 532 is directed parallel to pitch axis 6 and to the right or left relative to hull 22, based on the desired yaw. Upon operation of fore propulsion assembly 532, LA 10 may be caused to yaw in reaction to the directed thrust associated with fore propulsion assembly 532.

In other exemplary embodiments, for example, where it is desired to cause a pitching motion associated with LA 10, fore propulsion assembly 532 may be rotated such that a thrust force associated with fore propulsion assembly 532 may be directed parallel to yaw axis and toward the ground (i.e., down) or toward the sky (i.e., up), based on the desired pitch. Upon operation of fore propulsion assembly 532, LA 10 may then be caused to pitch in reaction to the directed thrust associated with fore propulsion assembly 532.

According to still other embodiments, for example, where it is desired to cause a rolling motion associated with LA 10, starboard propulsion assembly 533 may be rotated such that a thrust force associated with starboard propulsion assembly 533 may be directed parallel to yaw axis 7 and toward the ground (i.e., down) or toward the sky (i.e., up) based on the desired roll, and/or port propulsion assembly 534 may be rotated such that a thrust force associated with port propulsion assembly 534 may be directed in a direction opposite from the direction of the thrust force associated with starboard propulsion assembly 533. Upon operation of starboard propulsion assembly 533 and port propulsion assembly 534, LA 10 may then be caused to roll in reaction to the directed thrusts. One of ordinary skill in the art will recognize that similar results may be achieved using different combinations and rotations of propulsion assemblies 31 without departing from the scope of the present disclosure.

Fore, starboard, and port propulsion assemblies 532, 533, and 534 may also be configured to provide thrust forces for generating forward or reverse motion of LA 10. For example, starboard propulsion unit 533 may be mounted to propulsion mount 430 and configured to pivot from a position in which an associated thrust force is directed in a downward direction (i.e., toward the ground) to a position in which the associated thrust force is directed substantially parallel to roll axis 5 and toward the rear of LA 10. This may allow starboard propulsion unit 533 to provide additional thrust to supplement thrusters. Alternatively, starboard propulsion unit 534 may be rotated from a position in which an associated thrust force is directed substantially parallel to roll axis 5 and toward the rear of LA 10, to a position where the associated thrust force is directed along pitch axis 6 such that an adverse wind force may be counteracted.

In addition to fore, starboard, and port propulsion assemblies 532, 533, and 534, respectively, propulsion system 30 may include additional propulsion assemblies, such as one or more starboard thrusters 541 and one or more port thruster 542 configured to provide horizontal thrust forces to LA 10. Starboard and port thrusters 541 and 542 may be mounted to keel hoop 120, lateral frame members 122, horizontal stabilizing members 315 (as shown in FIG. 3A), or any other suitable location associated with LA 10. Starboard and port thrusters 541 and 542 may be mounted using an operative propulsion unit mount 430 similar to that described above, or, alternatively, starboard and port thrusters 541 and 542 may be mounted such that minimal rotation or pivoting may be enabled (e.g., substantially fixed) as shown in FIG. 4C. For example, starboard and port thrusters 541 and 542 may be mounted to keel hoop 120 at an aft location on either side of vertical stabilizing member 310 (e.g., at approximately 160 degrees and negative 160 degrees, as shown in FIG. 5B). In some embodiments, starboard and port thrusters 541 and 542 may be substantially co-located with starboard and port propulsion assemblies 533 and 534 as described above (e.g., positive 120 degrees and negative 120 degrees). In such embodiments, propulsion unit mounts 430 associated with starboard and port propulsion assemblies 533 and 534 may include additional fastening points such that propulsion unit mounts 430 associated with starboard and port thrusters 541 and 542 may be operatively connected to one another. Alternatively, propulsion unit mounts 430 associated with starboard and port thrusters 541 and 542 may be operatively connected to substantially similar fastening points on support structure 20 as fastening points connected to propulsion unit mounts 430 associated with starboard and port propulsion assemblies 533 and 534.

In some embodiments, thrust from starboard and port thrusters 541 and 542 may be directed along a path substantially parallel to roll axis 5. Such a configuration may enable thrust forces associated with starboard and port thrusters 541 and 542 to drive LA 10 in a forward or reverse direction based on the thrust direction.

In some embodiments, thrust from starboard and port thrusters 541 and 542 may be configurable based on a position of associated propulsion unit mount 430. One of ordinary skill in the art will recognize that additional configurations for starboard and port thrusters 541 and 542 may be utilized without departing from the scope of this disclosure.

Figure 6:
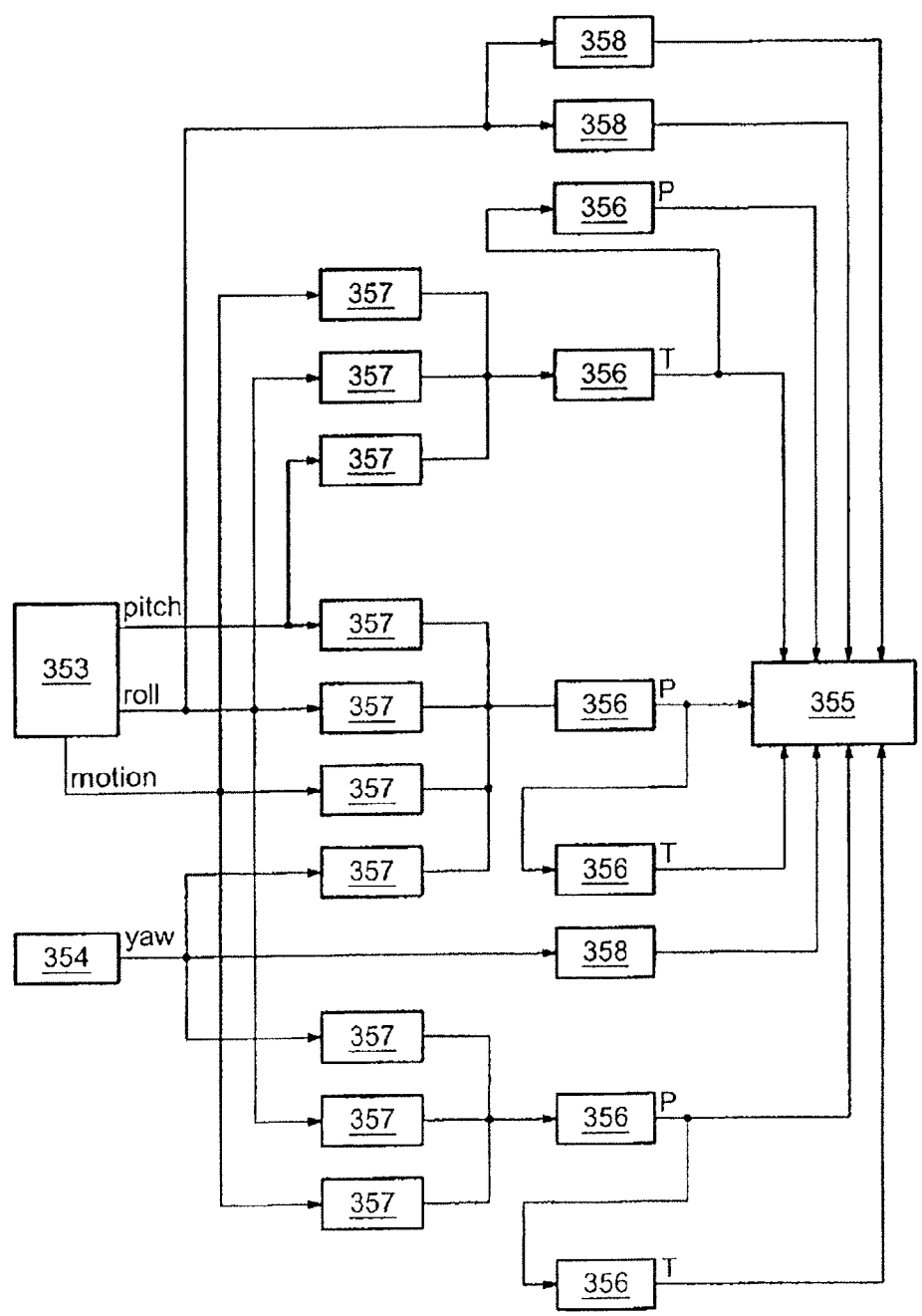
FIG. 6 is a block diagram of an exemplary control system.

FIG. 6 is a block diagram of an exemplary control system. According to some embodiments, gondola 35 may be equipped with levers and/or joysticks used to provide propulsion assemblies 31 and horizontal stabilizing members 315 and vertical stabilizing members 310 and/or horizontal control surfaces 360 and vertical control surface 350 with control signals. In addition, gondola 35 may comprise a lever (not shown) intended to control a pitch and roll motion associated with LA 10, as well as to control forward and backward or slowing motions associated with LA 10. Gondola 35 may further comprise two side rudder bars for controlling vertical stabilizing members, such as 310 and/or vertical control surfaces 350.

According to some embodiments, a lever 353 may be mounted on a fixed support in order to be angularly movable around the first axis and around a second axis, for example, perpendicular to the first axis. Movement of lever 353 around the first axis may control a pitch motion of LA 10, whereas movement of lever 353 around the second axis may control a roll motion of LA 10. In other words, when lever 353 is moved around the first axis, lift motor assemblies 31 with horizontal control surfaces 360 may be actuated. When lever 353 is moved around the second axis, lift motor assemblies 31 may be actuated accordingly.

In addition, lever 353 may be slidably mounted on a support in order to control forward and backward or slowing motion of LA 10 by controlling starboard and port thrusters 541 and 542, among other things.

Further, a side rudder bar 354 may also be actuated to control vertical stabilizing member 410, vertical control surface 350, and starboard and port thrusters 541 and 542 to aid a yawing motion of LA 10 when the speed thereof is not sufficient to cause a yaw by means of the vertical stabilizing member 310, or alternatively, at any time. As illustrated in FIG. 6, depending on its movement around the first and second axis, and depending on its sliding movement, the lever 353 may provide information indicative of pitch, roll, and forward/backward motion, and side rudder bar 354 may provide information indicative of a desired yaw.

As illustrated, pitch information may be used to control propulsion assemblies 31 and, in particular, a pitch setting and a throttle setting of fore propulsion unit 532, starboard propulsion unit 533, and port propulsion unit 534. Accordingly, roll information may be used to control the pitch and throttle settings associated with starboard propulsion unit 533 and port propulsion unit 534, as well as horizontal control surfaces 360. Further, forward/backward motion information may be used to control pitch and throttle settings associated with starboard and port thrusters 541 and 542. Yaw information may be used to control pitch and throttle settings associated with starboard and port thrusters 541 and 542, as well as the vertical stabilizing member 310.

As illustrated, pitch, roll, motion, and yaw information may be provided over an in-board communication network in a coded and a multiplexed way through a coder and a multiplexer 355.

As concerns information used to control pitch and throttle settings of the power conversion units 415 (e.g., propellers) and propulsion assemblies 31, the value of the signal issued from the lever 353 and rudder bar 354 is set by a global potentiometer 356. However, information associated with each of pitch, roll, motion, and yaw may be set separately by individual potentiometer, such as 357.

As concerns roll and yaw information intended to control vertical stabilizing member 310 and horizontal control surface 360, switches, such as switches 358 may be used to provide the multiplexer 355 with the corresponding information.

As indicated above, information associated with the various described control signals are then coded and transmitted, such as via a multiplexer or other similar device, over an in-board transmission or communication network (e.g., fly-by-wire and/or fly-by-light systems) to be decoded at the various propulsion assemblies 31 and/or vertical and horizontal control surfaces 350 and 360.

According to some embodiments, propulsion assemblies 31 and control surfaces, among other things, may be controlled by a computer 600. FIG. 7 is a block diagram of an exemplary embodiment of a computer 600 consistent with the present disclosure. For example, as shown in FIG. 7, computer 600 may include a processor 605, a disk 610, an input device 615, a multi-function display (MFD) 620, an optional external device 625, and interface 630. Computer 600 may include more or fewer components as desired. In this exemplary embodiment, processor 605 includes a CPU 635, which is connected to a random access memory (RAM) unit 640, a display memory unit 645, a video interface controller (VIC) unit 650, and an input/output (I/O) unit 655. The processor may also include other components.

In this exemplary embodiment, disk 610, input device 615, MFD 620, optional external device 625, and interface 630 are connected to processor 605 via I/O unit 655. Further, disk 610 may contain a portion of information that may be processed by processor 605 and displayed on MFD 620. Input device 615 includes the mechanism by which a user and/or system associated with LA 10 may access computer 600. Optional external device 625 may allow computer 600 to manipulate other devices via control signals. For example, a fly-by-wire or fly-by-light system may be included allowing control signals to be sent to optional external devices, including, for example, servo motors associated with propulsion unit mounts 430 and control surfaces associated with horizontal and vertical stabilizing member 310 and 315. "Control signals," as used herein, may mean any analog, digital, and/or signals in other formats configured to cause operation of an element related to control of airship 10 (e.g., a signal configured to cause operation of one or more control surfaces associated with LA 10). "Fly-by-wire," as used herein, means a control system wherein control signals may be passed in electronic form over an electrically conductive material (e.g., copper wire). Such a system may include a computer 600 between the operator controls and the final control actuator or surface, which may modify the inputs of the operator in accordance with predefined software programs. "Fly-by-light," as used herein, means a control system where control signals are transmitted similarly to fly-by-wire (i.e., including a computer 600), but wherein the control signals may transmitted via light over a light conducting material (e.g., fiber optics).

According to some embodiments, interface 630 may allow computer 600 to send and/or receive information other than by input device 615. For example, computer 600 may receive signals indicative of control information from flight controls 720, a remote control, and/or any other suitable device. Computer 600 may then process such commands and transmit appropriate control signals accordingly to various systems associated with LA 10 (e.g., propulsion system 30, vertical and horizontal control surfaces 350 and 360, etc.). Computer 600 may also receive weather and/or ambient condition information from sensors associated with LA 10 (e.g., altimeters, navigation radios, pitot tubes, etc.) and utilize such information for generating control signals associated with operating LA 10 (e.g., signals related to trim, yaw, and/or other adjustments).

According to some embodiments, computer 600 may include software and/or systems enabling other functionality. For example, computer 600 may include software allowing for automatic pilot control of LA 10. Automatic pilot control may include any functions configured to automatically maintain a preset course and/or perform other navigation functions independent of an operator of LA 10 (e.g., stabilizing LA 10, preventing undesirable maneuvers, automatic landing, etc.). For example, computer 600 may receive information from an operator of LA 10 including a flight plan and/or destination information. Computer 600 may use such information in conjunction with autopilot software for determining appropriate commands to propulsion units and control surfaces for purposes of navigating LA 10 according to the information provided. Other components or devices may also be attached to processor 605 via I/O unit 655. According to some embodiments, no computer may be used, or other computers may be used for redundancy. These configurations are merely exemplary, and other implementations will fall within the scope of the present disclosure.

Figure 8A:
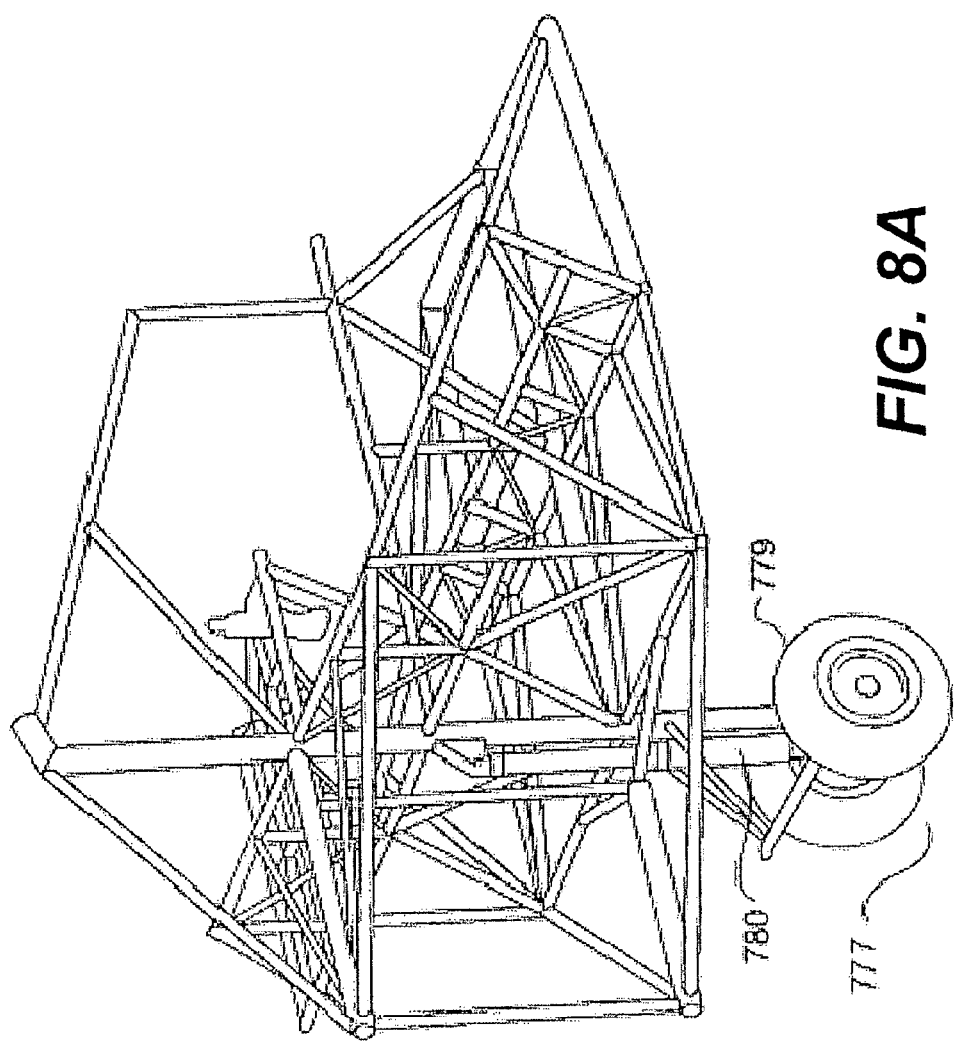
FIG. 8A is a schematic perspective view of an exemplary embodiment of a gondola chassis.

FIG. 8A illustrates an exemplary embodiment of a chassis 705 associated with gondola 35 consistent with the present disclosure. Chassis 705 may be configured for attachment to support structure 20 for purposes of providing support to systems associated with gondola 35, cargo, and/or passengers. Chassis 705 may include one or more frame members affixed to one another forming a shape associated with chassis 705. Some embodiments of chassis 705 may be configured to provide support to a pilot, navigation instruments, and/or flight control devices. Alternatively (or in addition), chassis 705 may be configured to provide support for multiple passengers in addition to a pilot and related flight gear. One of ordinary skill in the art will recognize that a design for gondola 35 may vary based on the proposed use of LA 10 (e.g., passenger ship, cargo ship, observation platform, etc.).

The one or more frame members comprising chassis 705 may include high strength-to-weight ratio materials including, for example, aluminum and/or carbon fiber. In some embodiments, the one or more frame members of chassis 705 may be constructed as substantially tubular and may include a carbon fiber/resin composite and honeycomb-carbon sandwich. The honeycomb-carbon sandwich may include a carbon mousse or foam-type material. In such embodiments, individual frame members may be fabricated in an appropriate size and shape for assembly of chassis 705. Such construction may lead to a suitable strength-to-weight ratio for chassis 705 as desired for a particular purpose of LA 10. One of skill in the art will recognize that chassis 705 may be constructed in numerous configurations without departing from the scope of the present disclosure. The configuration of chassis 705 shown in FIG. 8A is merely exemplary.

According to some embodiments, chassis 705 may be configured to provide support as well as an operative connection to front landing gear assembly 777. For example, front landing gear assembly 777 may be operatively connected to chassis 705. Front landing gear assembly 777 may include one or more wheels, one or more shock absorbers, and mounting hardware. Front landing gear assembly 777 may be connected to chassis 705 at a location configured to provide stability during periods when LA 10 is at rest or taxiing on the ground. For example, front landing gear assembly 777 may be connected to gondola 35 behind operator interface such that a balance is achieved between various elements of LA 10, rear landing gear assemblies 377, and front landing gear assembly 777. One of ordinary skill in the art will recognize that various positioning configurations of front landing gear assembly 777 (e.g., a point on gondola 35 directly beneath operator interface 710) may be used without departing from the scope of this disclosure. In some embodiments, front landing gear 777 may include dual wheels mounted on an axle operatively connected via oleo-pneumatic shock-absorbers to gondola 35 at a point behind operator interface 710.

According to some embodiments, front landing gear assembly 777 may be configured to perform other functions including, for example, steering LA 10 while on the ground, retracting, extending, adjusting for load, etc. For example, front landing gear assembly 777 may include an operative connection to gondola 35 such that front landing gear assembly 777 may be turned to cause LA 10 to head in a desired direction while moving on the ground. Such a connection may include a rack and pinion, a worm gear, an electric motor, and/or other suitable devices for causing front landing gear assembly 777 to turn in response to a steering input.

According to some embodiments, front landing gear assembly 777 may include an operative connection to a steering control associated with a yoke in gondola 35. An operator may turn the yoke causing a signal indicative of a steering force to be sent to computer 600. Computer 600 may then cause an electric motor associated with front landing gear assembly 777 to cause front landing gear assembly 777 to turn in a direction indicated by the steering force input from the operator. Alternatively, steering may be accomplished via a mechanical connection (e.g., cables, hydraulics, etc.) or any other suitable method. One of ordinary skill in the art will recognize that a steering control may be linked to flight controls 720, a dedicated steering control, and/or other suitable control without departing from the scope of the present disclosure.

Figure 8B:
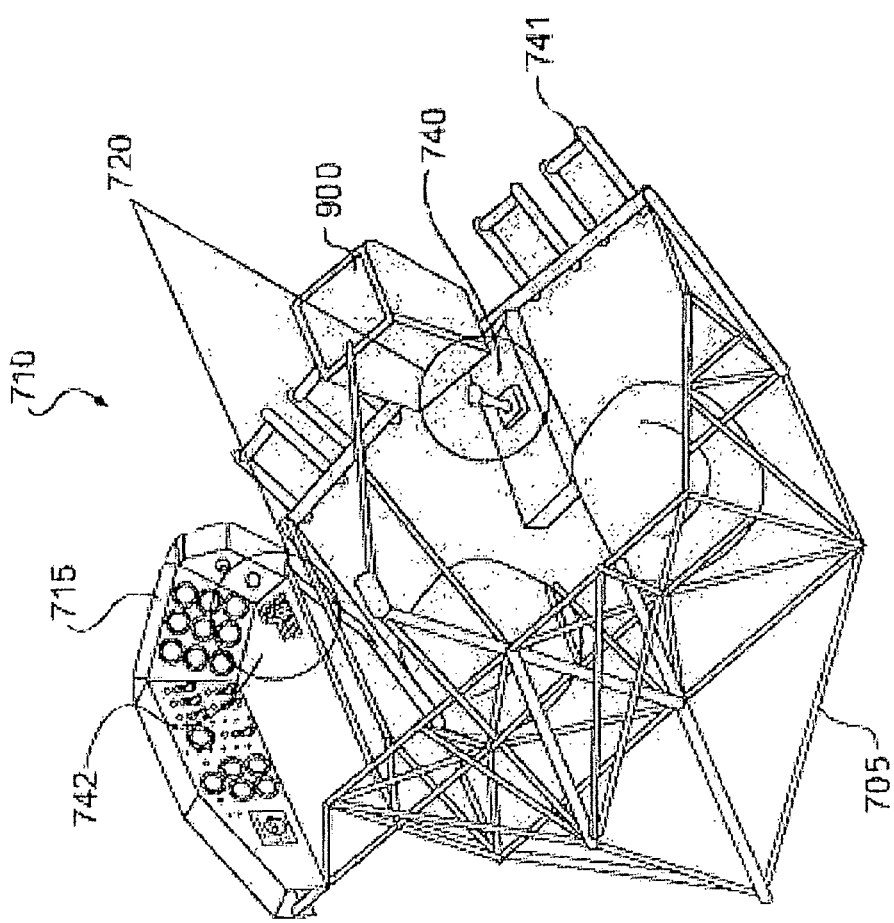
FIG. 8B is a schematic, perspective view of an exemplary embodiment of a gondola.

FIG. 8B illustrates an exemplary embodiment of a gondola 35 consistent with the present disclosure. Gondola 35 may include chassis 705, operator interface 710, front landing gear assembly 777 (e.g., as shown in FIG. 8A), a computer 600 (see, e.g., FIG. 7), and/or ballast (not shown).

For example, gondola 35 may be configured to be mounted at a location on longitudinal frame member 124 such that a static equilibrium associated with LA 10 may be maintained. Gondola 35 may be mounted, for example, at a location along roll axis 5, such that a moment about pitch axis 6 associated with the mass of gondola 35 substantially counteracts a moment about pitch axis 6 associated with the mass of empennage assembly 25. Gondola 35 may be mounted at a location along pitch axis 6 such that no moment about roll axis 5 results from the mass of gondola 35.

Gondola 35 may include an operator interface, which may be configured to provide a location for a pilot or other individual to perform tasks associated with flying LA 10. Operator interface 710 may include navigation instruments 715, flight controls 720, and/or ballonet control, among other things (e.g., seating, etc.). Navigation instruments 715 may include analog instruments (e.g., altimeter, airspeed indicator, radios, etc.), digital instruments, and/or may include one or more MFDs 620. MFD 620 may include any avionics display providing displays of multiple functions, such as a primary-function display (PFD). As is well-known to those skilled in the art, an MFD may include a CRT display, a plasma display, an LCD display, a touch sensitive display, and/or any other type of electronic device. Computer 600 may be linked to navigation instruments and/or MFD 620, as well as vertical and horizontal control surfaces 350 and 360, propulsion system 30, and/or other systems associated with LA 10.

Flight controls 720 may be configured to provide an operator of LA 10 with controls enabling control of LA 10 during taxiing and flight. Flight controls 720 may receive inputs indicative of desired navigation functions (e.g., turn, yaw, pitch, etc.) from an operator and provide such inputs to computer 600, vertical and/or horizontal control surfaces 350 and 360, propulsion unit mounts 430, or other suitable systems configured to cause LA 10 to be directed as desired by the operator. Flight controls 720 may include a flight stick 740, control pedals 741, and/or engine controls 742. Flight controls may be communicatively connected to computer 600, vertical and horizontal control surfaces 350 and 360, propulsion unit mounts 430, and other systems as desired.

According to some embodiments, a ballonet control (not shown) may be configured to allow control of a pressure within the ballonet. For example, ballonet control may enable actuation of pumps, valves, flaps, and/or other devices, such that the pressure within the ballonet may be controlled. It may be desirable, for example, to increase a pressure within the ballonet to produce a ballasting effect on LA 10. An operator may actuate the ballonet control, which may cause air pumps (not shown) to pump pressurized air into the ballonet, thereby exerting pressure on first envelope 282. Alternatively (or in addition), the operator may wish to utilize pressurized gas within the ballonet to generate a stopping force on LA 10. The operator may actuate the ballonet control in such a way as to cause a valve to open, releasing a stream of pressurized air from the ballonet directed in a direction substantially opposite that of a direction of travel associated with LA 10. The ballonet control may be communicatively connected to computer 600 or other suitable device for causing a desired outcome related to ballonet. One of ordinary skill in the art will recognize that numerous other operations may be associated with ballonet control and are intended to fall within the scope of the present disclosure.

Figure 9:
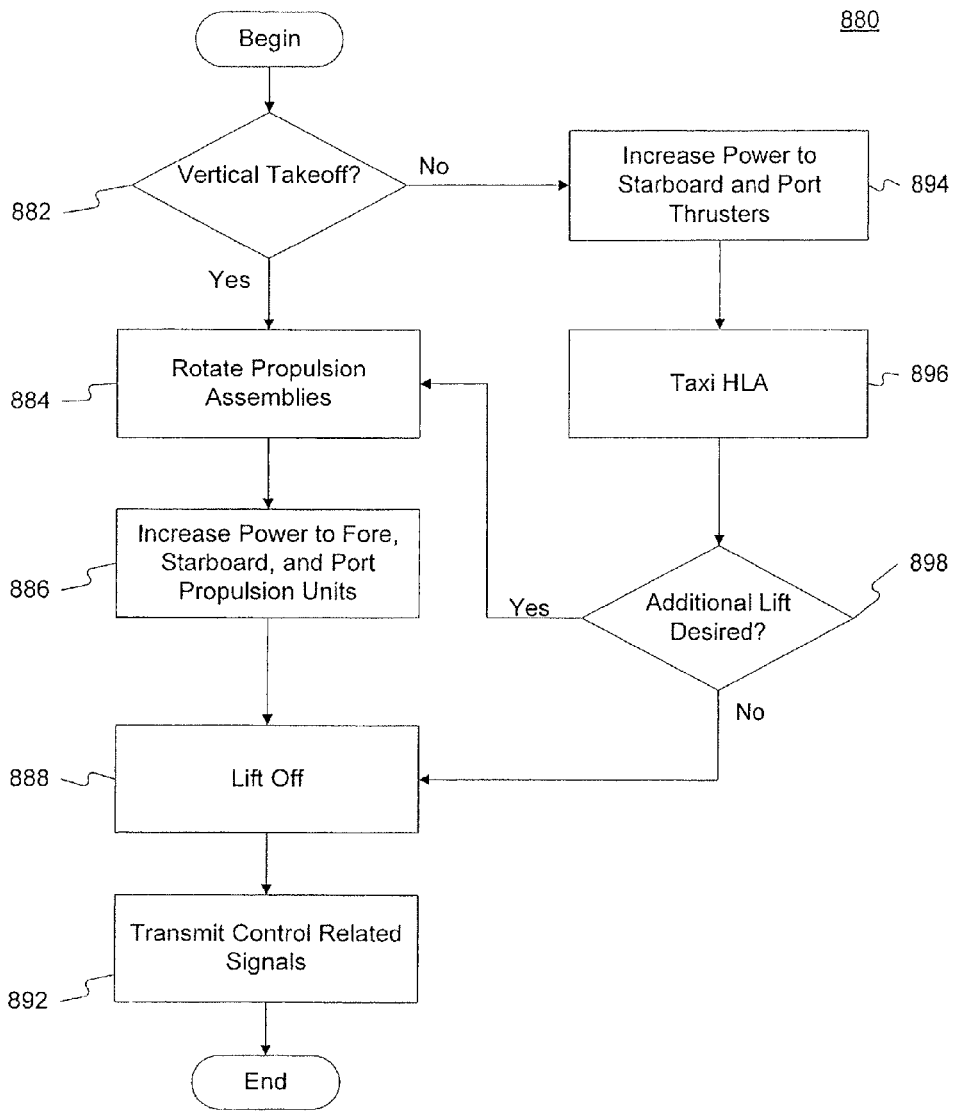
FIG. 9 is a flowchart illustrating an exemplary embodiment of a method for controlling an LA during a take-off maneuver.

FIG. 9 is a flowchart 880 illustrating an exemplary embodiment of a method for controlling LA 10 during a take-off maneuver. An operator of LA 10 may determine whether to exercise a vertical take-off (i.e., ascent without taxiing LA 10) or a taxiing take-off from a current position of LA 10 (step 882). For example, where LA 10 is positioned with minimum ability to taxi along the ground (e.g., there are many surrounding trees or buildings), the operator may determine that a vertical take-off may be most suitable (step 882: yes). Because hull 22 may include a substantial volume of a lighter-than-air lifting gas, LA 10 may vertically ascend based on lift forces associated with a lighter-than-air lifting gas, as described above. Alternatively (or in addition), an operator of LA 10 may desire to utilize forces associated with propulsion system 30 for vertical ascent. In such embodiments, the operator may, for example, actuate flight controls (e.g., a flight stick, an engine control, etc.) to cause propulsion unit mounts 430 associated with fore propulsion unit 532, starboard propulsion unit 533, and/or port propulsion unit 534 to rotate such that thrusts associated with the propulsion units 31 are directed substantially in a downward direction (step 884). According to some embodiments, upon receiving operator input, computer 600 may transmit control signals configured to cause manipulation of propulsion unit mounts 430 associated with fore propulsion unit 532, starboard propulsion unit 533, and/or port propulsion unit 534. Once the propulsion units 31 have been rotated to a desired position, power to such propulsion units 31 may be increased, for example, via a throttle (step 886). One of ordinary skill in the art will recognize that numerous methods exist for increasing power to various embodiments of propulsion assemblies 31 (e.g., throttle, electrical current regulator, etc.) and are intended to fall within the scope of the present disclosure. Increasing power to propulsion units 31 may then result in additional thrust from each propulsion unit 31 and therefore, additional upward force applied to support structure 20, thereby augmenting other lift forces associated with LA 10 (e.g., forces associated with lighter-than-air gas). LA 10 may then leave the ground in a vertical take-off maneuver (step 888).

According to some embodiments, an operator of LA 10 may determine that a taxiing take-off would be more desirable (e.g., where LA 10 is heavy due to cargo) (step 882: no). Taxiing of LA 10 may be accomplished by providing power to port and starboard thrusters 542 and 541 while wheels associated with front and rear landing gear assemblies 777 and 377 are in contact with the ground (step 894). Providing power to port and starboard thrusters may cause thrust associated with port and starboard thrusters to exert a force on LA 10 via support structure 20, causing LA 10 to taxi in a direction opposite such thrust (e.g. forward) (step 896). During such rolling, an operator of LA 10 may control a direction of travel associated with LA 10 using a control (e.g., yoke) communicatively coupled with a steering assembly of front landing gear assembly 777, among other things (e.g., control surfaces 350 and 360). The operator may further perform other functions while taxiing LA 10, such as, for example, adjusting fore propulsion unit 532, starboard propulsion unit 533, and/or port propulsion unit 534 to provide additional lift as described above (step 898: yes). Alternatively, an operator may not desire additional lift from such propulsion assemblies 31 and may allow LA 10 to lift off under aerodynamic and aerostatic lift forces associated with LA 10 (step 898: no).

Once airborne, an operator and/or computer 600 may transmit various signals configured to control various aspects of flight associated with LA 10 (step 892). For example, during flight, an operator of LA 10 may desire to turn LA 10 to a different heading utilizing flight controls 720. In such an example, the operator may actuate one or more flight controls 720 causing corresponding signals to be transmitted to computer 600. Computer 600 may then determine corresponding actions based on the outcome desired by the operator (e.g., turn right). Such actions may include manipulation of horizontal and/or vertical control surfaces 360 and 350 and/or manipulation of propulsion units 31 (e.g., power and direction control, among other things). Computer 600 may, therefore, generate control signals configured to cause a particular action associated with various systems of LA 10 to cause the intended outcome. For example, computer 600 may transmit a signal to a hydraulic actuator associated with horizontal control surfaces 360, causing the control surface to change its angle of attack. Further, computer 600 may transmit a signal configured to cause a propulsion unit mount 430 associated with fore propulsion unit 532 to rotate such that a thrust force is directed to cause a yawing motion of LA 10. Such actions may facilitate a stable turn according to the desire of the operator of LA 10. Alternatively, mechanical connections may be utilized to bypass computer 600 and transmit operator-desired actions directly to various systems of LA 10. For example, an operator may utilize a throttle to increase power to a propulsion unit 31. Motion of such a throttle may cause a cable communicatively connected to a power source 410 to increase or decrease fuel supplied to power source 410. One of skill in the art will recognize that computer 600 may be used in tandem with mechanical connections for accomplishing desired actions associated with navigation of LA 10. It is intended that such configurations fall within the scope of the present disclosure.

According to some embodiments, it may be desirable for computer 600 to transmit in-flight signals configured to, for example, correct course heading and/or assist in stabilizing LA 10 independent of an operator of LA 10. For example, computer 600 may calculate, based on inputs from various sensors (e.g., altimeter, pitot tubes, anemometers, etc.), a wind speed and direction associated with ambient conditions surrounding LA 10. Based on such information, computer 600 may determine a set of operational parameters that may maintain stability of LA 10. Such parameters may include, for example, propulsion unit parameters, control surface parameters, ballast parameters, etc. Computer 600 may then transmit commands consistent with such parameters assisting in maintaining stability and/or control of LA 10. For example, computer 600 may determine that as LA 10 gains altitude, the ballonet should be pressurized to prevent over-pressurization of first envelope 282. In such a situation, computer 600 may cause air pumps to activate, thereby pressurizing the ballonet to a desirable pressure. It should be noted that data associated with wind and other various effects on LA 10 (e.g., aerodynamic stresses) may be determined empirically and/or experimentally, and stored within computer 600. This may allow computer 600 to perform various actions consistent with safely navigating LA 10.

According to some embodiments, once aloft, it may be desired to hold LA 10 substantially stationary over a desired area and at a desired altitude. For example, computer 600 and/or an operator may transmit control signals to propulsion system 30, vertical and horizontal control surfaces 350 and 360, the ballonet, and/or other systems associated with LA 10, such that LA 10 remains substantially stationary even where wind currents may cause LA 10 to be exposed to aerodynamic forces.

Figure 10:
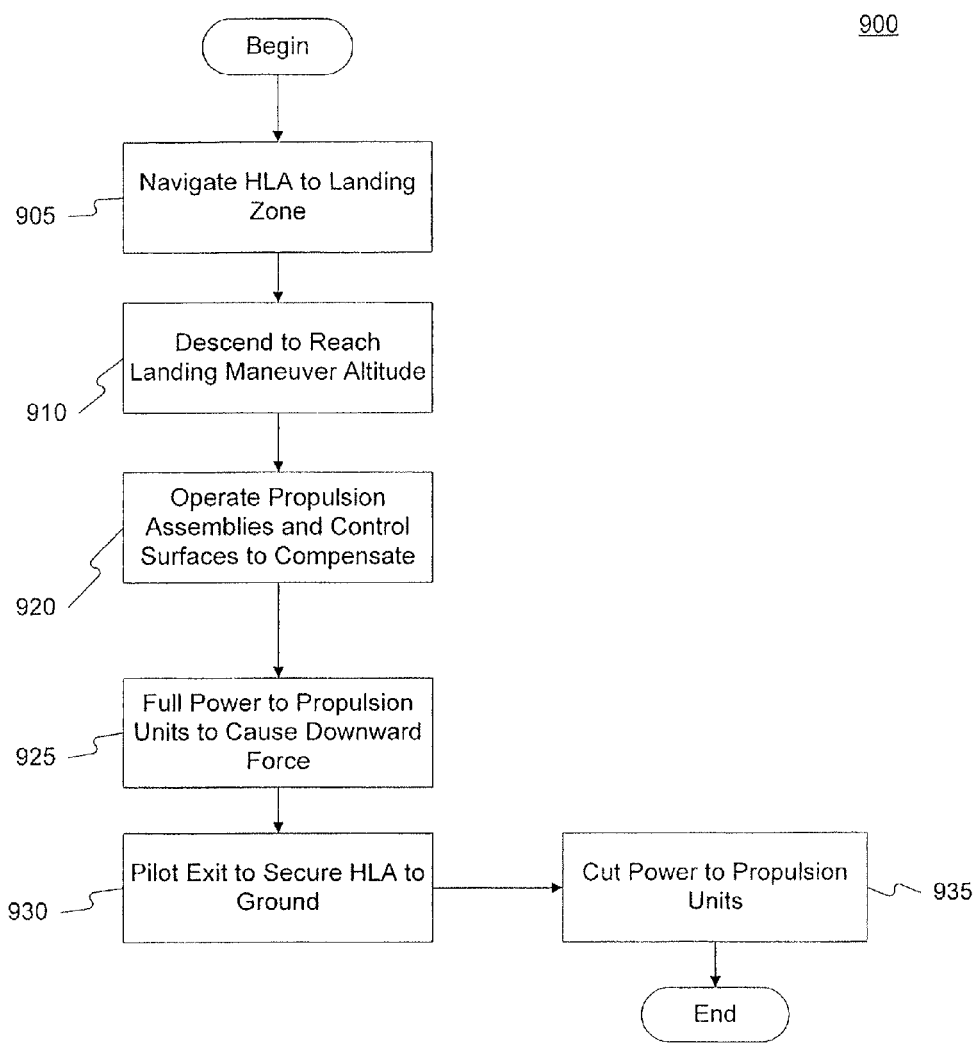
FIG. 10 is a flowchart illustrating an exemplary embodiment of a method for performing a landing maneuver associated with an LA.

FIG. 10 illustrates a flowchart 900 of an exemplary embodiment of a method for performing a landing maneuver associated with LA 10. A landing maneuver of LA 10 may, for example, include navigating LA 10 to a desired landing area (step 905). Such navigation may involve steps similar to those described in relation to FIG. 9 above. Once LA 10 has reached a desired landing area, or is within proximity thereof, an operator of LA 10 may cause LA 10 to begin descending (step 910). Such descent may be substantially vertical in nature or may include descent coupled with a horizontal vector similar to descents made by airplanes. During descent, computer 600 and/or the operator may monitor ambient conditions and the stability of LA 10 to enable compensatory actions to be taken. For example, turbulence may be encountered during descent, which may adversely affect LA 10. Computer 600 and/or the operator may take corrective action to minimize adverse effects, including, for example, manipulating propulsion units 31, horizontal and vertical control surfaces 360 and 350, and/or ballast (step 920).

Upon reaching a point within a desired distance of the ground, operator and/or computer 600 may cause propulsion unit mounts 430 associated with fore, starboard, and port propulsion assemblies 532, 533, and 534 to rotate such that thrusts associated with fore, starboard, and port propulsion assemblies 532, 533, and 534 are directed substantially upwards. This may enable a vertical thrust from fore, starboard, and port propulsion assemblies 532, 533, and 534 to exert a force substantially downward. As a result, power to fore, starboard, and port propulsion assemblies 532, 533, and 534 may be increased such that a desired downward pressure (e.g., sufficient to force LA 10 to the ground) is generated (step 925). The operator may then exit gondola 35 and secure the airship to a ground fixture (e.g., a docking post) using lines or other fixtures (e.g., a shaft or latch) attached to support structure 20, or other suitable location. Once LA 10 has been secured, power to propulsion units 31 may be cut (step 935).

Other embodiments of the invention will be apparent to those skilled in the art from consideration of the specification and practice of the invention disclosed herein. For example, LA 10 may include a platform or other cargo carrying structure configured to suspend communications equipment (e.g., satellite relay/receiver, cell tower, etc.) over a particular location. Because LA 10 may utilize, for example, associated control surfaces, propulsion assemblies 31, and its oblate spheroid shape to remain suspended and substantially stationary over a given location, LA 10 may operate as a communications outpost in desired areas. Further, based on numerous characteristics of LA 10, other functions, including, but not limited to, construction lifting, transportation (e.g., passenger carriage and/or tourism), satellite communications, display (e.g., advertising), recreation, military or other reconnaissance/surveillance (e.g., for border patrol), disaster relief support, scientific studies, etc. may be performed utilizing LA 10. Such functions may be performed by remotely controlling and/or utilizing manned flights of LA 10.

It is intended that the specification and examples be considered as exemplary only, with a true scope and spirit of the invention being indicated by the following claims.

What is claimed is:

1. A flight control system for an airship, the system comprising:
   one or more operator controls configured to receive operator input;
   a horizontal control surface associated with a horizontal stabilizing member;

a vertical control surface associated with a vertical stabilizing member; and at least five propulsion assemblies, wherein:
- a first of the five propulsion assemblies is operably coupled to a support structure associated with the airship and located at a first location along a periphery associated with the airship;
- a second of the five propulsion assemblies is operably coupled to the support structure and located along the periphery at approximately 120 degrees with respect to the first propulsion assembly;
- a third of the five propulsion assemblies is operably coupled to the support structure and located along the periphery at approximately negative 120 degrees with respect to the first propulsion assembly;
- a fourth propulsion assembly configured to direct a thrust along an axis substantially parallel to a roll axis of the airship and substantially co-located with the second of the five propulsion assemblies; and
- a fifth propulsion assembly configured to direct a thrust along an axis substantially parallel to the roll axis of the airship and substantially co-located with the third of the five propulsion assemblies; and a processor configured to receive an input signal from the operator controls and generate a signal according to the input signal.

2. The flight control system of claim 1, wherein at least one of the five propulsion assemblies comprises a variable pitch propeller.

3. The flight control system of claim 2, wherein the signal is configured to cause a modification to a pitch associated with a variable pitch propeller.

4. The flight control system of claim 1, further comprising one or more propulsion servo motors operably coupled to any of the five propulsion assemblies.

5. The flight control system of claim 4, further comprising one or more horizontal control surface servo motors operably coupled to the horizontal control surface, and one or more vertical control surface servo motors operably coupled the vertical control surface.

6. The flight control system of claim 5, wherein the signal is provided to any of the one or more propulsion servo motors, one or more horizontal control surface servo motors, and one or more vertical control surface servo motors via a fly-by-wire system.

7. The flight control system of claim 5, wherein the signal is provided to any of the one or more propulsion servo motors, one or more horizontal control surface servo motors, and one or more vertical control surface servo motors via a fly-by-light system.

8. The flight control system of claim 1, wherein the processor is configured to generate signals configured to:
- navigate the airship within close proximity to a surface of the earth;
- direct a thrust associated with at least one propulsion assembly in a direction configured to impart a downward force to the airship; and
- limit motion of the airship until a securing of the airship to a ground fixture has been substantially completed.

9. The flight control system of claim 8, wherein the signal is configured to modify an operational parameter of at least one of the first propulsion assembly, the second propulsion assembly, the third propulsion assembly, the fourth propulsion assembly, and the fifth propulsion assembly, to cause a reduction of a horizontal velocity associated with the airship and a reduction of an altitude associated with the airship.

10. The flight control system of claim 8, wherein directing thrust is accomplished via modification to a pitch associated with a variable pitch propeller.

11. The flight control system of claim 1, wherein the processor is configured to:
- receive an input indicative of a take-off type;
- provide, based on the take-off type, a signal configured to modify operating parameters associated with one or more of the five propulsion assemblies to achieve a desired thrust direction;
- determine, based on the take-off type, a lift force associated with a lighter-than-air gas provided within a hull of the airship, and aerodynamic forces associated with the hull, a power setting for the five propulsion assemblies; and
- provide one or more signals to at least one control surface associated with the airship according to the take-off type.

12. The flight control system of claim 11, wherein the take-off type comprises a substantially vertical take-off.

13. The flight control system of claim 11, wherein the take-off type comprises a taxiing take-off.

14. The flight control system of claim 1, wherein the processor is configured to:
- determine a horizontal velocity and a pitch associated with the airship;
- calculate a delta between a predetermined critical speed value and the horizontal velocity associated with the airship; and
- transmit a signal based on the delta and the pitch associated with the airship to at least one of the first propulsion assembly, the second propulsion assembly, the third propulsion assembly, the fourth propulsion assembly, and the fifth propulsion assembly.

15. The flight control system of claim 14, wherein the signal is configured to cause a modification in an operating parameter associated with at least one of the first propulsion assembly, the second propulsion assembly, the third propulsion assembly, the fourth propulsion assembly, and the fifth propulsion assembly, such that a force tending to counteract an aerodynamically generated pitching moment is generated.

16. The flight control system of claim 15, wherein the processor is further configured to transmit a second signal to the horizontal control surface based on the delta and the pitch associated with the airship.

17. The flight control system of claim 16, wherein the second signal is configured to manipulate the horizontal control surface to generate an additional force configured to counteract the pitching moment.

18. The flight control system of claim 1, wherein the processor is configured to:
- receive a signal indicative of a desired pitch associated with the airship;
- determine at least one of a power setting and a propeller pitch associated with the first propulsion assembly based on the signal indicative of a desired pitch;
- determine a horizontal control surface setting based on at least one of the power setting, the propeller pitch, and the signal indicative of a desired pitch;
- transmit a first control signal indicative of the power setting and the propeller pitch; and
- transmit a second control signal indicative of the horizontal control surface setting configured to cause the horizontal control surface to respond according to the horizontal control surface setting.

19. The flight control system of claim 18, wherein the signal indicative of a desired pitch is received from an operator of the airship.

20. The flight control system of claim 18, wherein the signal indicative of a desired pitch is calculated by the processor based on a flight plan.

21. The flight control system of claim 1, wherein the processor is configured to:
- receive a signal indicative of a desired yaw associated with the airship;
- determine at least one of a power setting and a propeller pitch associated with the fourth propulsion assembly and the fifth propulsion assembly based on the signal indicative of a desired yaw;
- determine a vertical control surface setting based on at least one of the power setting, the propeller pitch, and the signal indicative of a desired yaw;
- transmit a first control signal indicative of the power setting and the propeller pitch; and
- transmit a second control signal indicative of the vertical control surface setting configured to cause the vertical to respond according to the vertical control surface setting.

22. The flight control system of claim 21, wherein the signal indicative of a desired yaw is received from at least one of an operator of the airship and the processor based on a flight plan.

23. The flight control system of claim 1, wherein the processor is configured to:
- receive a signal indicative of a desired roll associated with the airship;
- determine at least one of a power setting and a propeller pitch associated with the second propulsion assembly and the third propulsion assembly based on the signal indicative of a desired roll;
- determine a horizontal control surface setting based on at least one of the power setting, the propeller pitch, and the signal indicative of a desired roll;
- transmit a first control signal indicative of the power setting and the propeller pitch; and
- transmit a second control signal indicative of the horizontal control surface setting configured to cause the horizontal control surface to respond according to the horizontal control surface setting.

24. The flight control system of claim 23, wherein the signal indicative of a desired roll is received from an operator of the airship.

25. The flight control system of claim 23, wherein the signal indicative of a desired roll is calculated by the processor based on a flight plan.

* * * * *